US012124182B2

(12) United States Patent
Tetsuno et al.

(10) Patent No.: US 12,124,182 B2
(45) Date of Patent: Oct. 22, 2024

(54) IMAGE-FORMING APPARATUS TO CONTROL POTENTIAL DIFFERENCE BASED ON IMAGE-FORMING OPERATION

(71) Applicant: CANON KABUSHIKI KAISHA, Tokyo (JP)

(72) Inventors: Shuichi Tetsuno, Kanagawa (JP); Toshihiko Takayama, Kanagawa (JP); Shuhei Tokiwa, Tokyo (JP); Shimpei Ishikawa, Kanagawa (JP); Shunsuke Matsushita, Kanagawa (JP); Mikihiko Hamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/181,986

(22) Filed: Mar. 10, 2023

(65) Prior Publication Data

US 2023/0305422 A1 Sep. 28, 2023

(30) Foreign Application Priority Data

Mar. 22, 2022 (JP) ................................ 2022-045084

(51) Int. Cl.

| | |
|---|---|
| ***G03G 15/00*** | (2006.01) |
| ***G03G 15/02*** | (2006.01) |
| ***G03G 15/06*** | (2006.01) |
| ***G03G 21/00*** | (2006.01) |

(52) U.S. Cl.

CPC ..... *G03G 15/0266* (2013.01); *G03G 15/0216* (2013.01); *G03G 15/065* (2013.01); *G03G 21/0064* (2013.01); *G03G 2215/022* (2013.01)

(58) Field of Classification Search

CPC .......... G03G 15/0216; G03G 15/0266; G03G 15/065; G03G 15/5004; G03G 21/0035; G03G 21/0064; G03G 2215/022

See application file for complete search history.

(56) References Cited

U.S. PATENT DOCUMENTS

2019/0265625 A1* 8/2019 Okubo .............. G03G 15/0266
2020/0272069 A1* 8/2020 Kobayashi .......... G03G 15/065

FOREIGN PATENT DOCUMENTS

| | | |
|---|---|---|
| JP | 2010026198 A | 2/2010 |
| JP | 2016206600 A | 12/2016 |
| JP | 2017032744 A | 2/2017 |
| JP | 2017107075 A | 6/2017 |

* cited by examiner

*Primary Examiner* — Sophia S Chen

(74) *Attorney, Agent, or Firm* — Canon U.S.A., Inc. IP Division

(57) ABSTRACT

An image-forming apparatus to execute an image-forming operation includes an image bearing member, a charging member to charge at a charging portion a surface of, and a developing member to supply at a developing portion toner to, the image bearing member. When a rotating image bearing member stops rotating, a surface potential of the image bearing member formed on the developing portion is defined as V1, a developing voltage applied to the developing member is defined as V2, a charging voltage applied to the charging member is defined as V3, and a surface potential of the image bearing member formed on the charging portion is defined as V4. A first potential difference, which is a potential difference between V2 and V1, and a second potential difference, which is a potential difference between V3 and V4, are controlled based on information about a number of execution times of the image-forming operation.

12 Claims, 12 Drawing Sheets

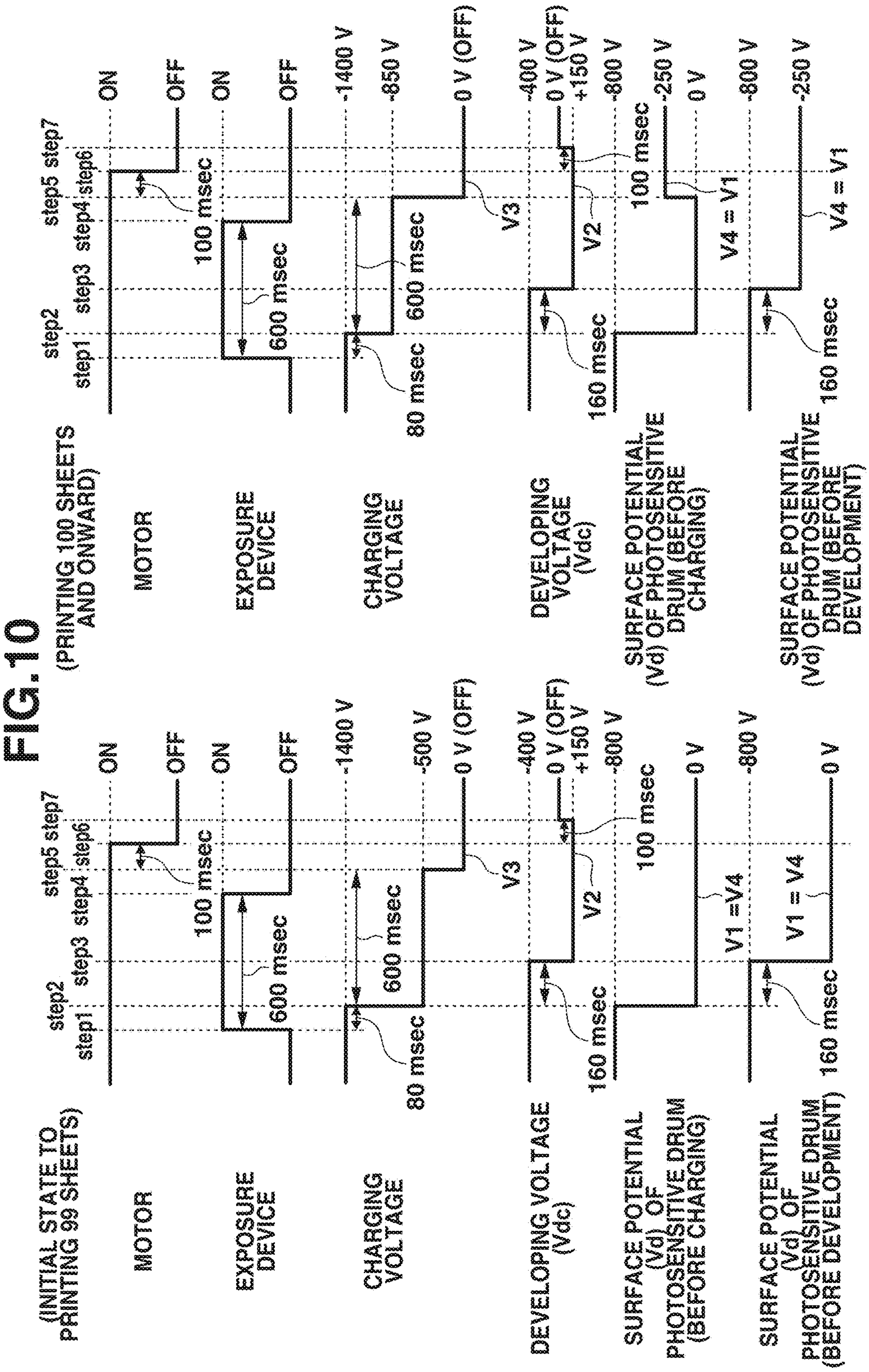
FIG.10
(INITIAL STATE TO PRINTING 99 SHEETS)
MOTOR
EXPOSURE DEVICE
CHARGING VOLTAGE
DEVELOPING VOLTAGE (Vdc)
SURFACE POTENTIAL (Vd) OF PHOTOSENSITIVE DRUM (BEFORE CHARGING)
SURFACE POTENTIAL (Vd) OF PHOTOSENSITIVE DRUM (BEFORE DEVELOPMENT)
step1
step2
step3
step4
step5
step6
step7
ON
OFF
ON
OFF
-1400 V
-500 V
0 V (OFF)
-400 V
0 V (OFF)
+150 V
-800 V
0 V
-800 V
0 V
80 msec
600 msec
600 msec
100 msec
160 msec
100 msec
160 msec
V3
V2
V1 =V4
V1 = V4
(PRINTING 100 SHEETS AND ONWARD)
MOTOR
EXPOSURE DEVICE
CHARGING VOLTAGE
DEVELOPING VOLTAGE (Vdc)
SURFACE POTENTIAL (Vd) OF PHOTOSENSITIVE DRUM (BEFORE CHARGING)
SURFACE POTENTIAL (Vd) OF PHOTOSENSITIVE DRUM (BEFORE DEVELOPMENT)
step1
step2
step3
step4
step5
step6
step7
ON
OFF
ON
OFF
-1400 V
-850 V
0 V (OFF)
-400 V
0 V (OFF)
+150 V
-800 V
-250 V
0 V
-800 V
-250 V
80 msec
600 msec
600 msec
100 msec
160 msec
100 msec
160 msec
V3
V2
V4 = V1
V4 = V1

IMAGE-FORMING APPARATUS TO CONTROL POTENTIAL DIFFERENCE BASED ON IMAGE-FORMING OPERATION

BACKGROUND

Field

The present disclosure relates to an image-forming apparatus, such as a laser printer, a copying machine, and a facsimile, that uses an electrophotographic method or the like to transfer a toner image formed on an image bearing member to a recording material and acquires a recorded image.

Description of the Related Art

An electrophotographic method is known as an image recording method used in image-forming apparatuses, such as printers and copying machines. The electrophotographic method uses an electrophotographic process to form an electrostatic latent image on a photosensitive drum (hereinbelow, referred to as a drum) with a laser beam and develops the electrostatic latent image with a charged coloring material (hereinbelow, referred to as toner) to form a developer image. The developer image is transferred and fixed to a recording material, and an image is formed. Recently, a cleanerless method has been discussed for a purpose of downsizing image-forming apparatuses. The cleanerless method realizes, at a developing unit, simultaneous operation of image development and cleaning of toner, which is developer remaining on a surface of the drum after a transfer process, and the toner removed and collected from the drum is reused.

Because a cleaner is not provided on the drum in the cleanerless method, contamination of image-forming apparatus members tends to occur due to the toner that remains on the surface of the drum after the transfer process. Such an issue particularly arises in a configuration in which the drum is charged by a charging member, such as a charging roller, being in contact with the drum, and toner charged to a polarity opposite to a normal polarity (hereinbelow referred to as reversed toner) tends to electrostatically adhere to the charging member at the time of charging the drum. The reversed toner adhering to the charging member may interfere with charging operation of the charging member to the drum, which may cause an image defect. The reversed toner adhering to the charging member may also cause such a phenomenon that, in an image-forming apparatus stop operation to stop driving of the drum after a voltage applied to the charging member is turned off, the reversed toner is released from an electrostatic adhesion force to the charging member due to turning off of the voltage applied to the charging member and is discharged to the drum, which may result in an image defect in the next image formation. Japanese Patent Application Laid-Open No. 2010-026198 discusses a configuration in which a voltage to be applied to a charging member is changed to change a potential difference between the charging member and a drum, which causes toner adhering to a charging roller to move to a surface of the drum, and thus, a charging member is cleaned.

The configuration discussed in Japanese Patent Application Laid-Open No. 2010-026198 has however the following issue. Depending on a state of an image-forming apparatus, fogging which is due to toner from a developing member developed on a drum of a non-image unit occurs, and consequently, the fogging of reversed toner increases. Because transfer residual toner is also affected by the state of the image-forming apparatus, a periodical cleaning operation for the charging member is required. Even if the cleaning operation is performed periodically, the reversed toner may still adhere to the charging member in some cases before a stop operation of the image-forming apparatus.

SUMMARY

The present disclosure is directed to providing an image forming apparatus that suppresses occurrence of an adverse effect on an image even in a state in which toner adheres to a charging member before a stop operation of the image-forming apparatus.

According to an aspect of the present disclosure, an image-forming apparatus to execute an image-forming operation to form an image on a recording material includes an image bearing member configured to rotate, a charging member configured to form a charging portion by being in contact with the image bearing member and to charge a surface of the image bearing member at the charging portion, a developing member configured to supply toner to the image bearing member at a developing portion facing the image bearing member, a drive unit configured to rotationally drive the image bearing member, a storing unit configured to store information about a number of execution times of the image-forming operation, a charging voltage applying unit configured to apply a charging voltage to the charging member, a developing voltage applying unit configured to apply a developing voltage to the developing member, and a control unit configured to control the drive unit, the charging voltage applying unit, and the developing voltage applying unit, wherein, in a case where a first state in which the image bearing member rotates is shifted to a second state in which the image bearing member stops rotating, a surface potential of the image bearing member formed on the developing portion is defined as V1, the developing voltage applied to the developing member is defined as V2, the charging voltage applied to the charging member is defined as V3, and a surface potential of the image bearing member formed on the charging portion is defined as V4, and wherein the control unit controls a first potential difference, which is a potential difference between the V2 and the V1, and a second potential difference, which is a potential difference between the V3 and the V4, based on the information about the number of execution times of the image-forming operation.

Further features of the present disclosure will become apparent from the following description of exemplary embodiments with reference to the attached drawings.

BRIEF DESCRIPTION OF THE DRAWINGS

FIG. 10 is a diagram illustrating a stop operation of an image-forming apparatus according to a third exemplary embodiment.

DESCRIPTION OF THE EMBODIMENTS

Exemplary embodiments of the present disclosure will be described in detail below with reference to the attached drawings. However, dimensions, materials, and shapes of components described in the exemplary embodiments and their relative arrangements are to be appropriately changed depending on a configuration of an apparatus to which the present disclosure is applied and various conditions. In other words, the scope of the present disclosure is not limited to the exemplary embodiments described below.

Image-Forming Apparatus

Figure 1:
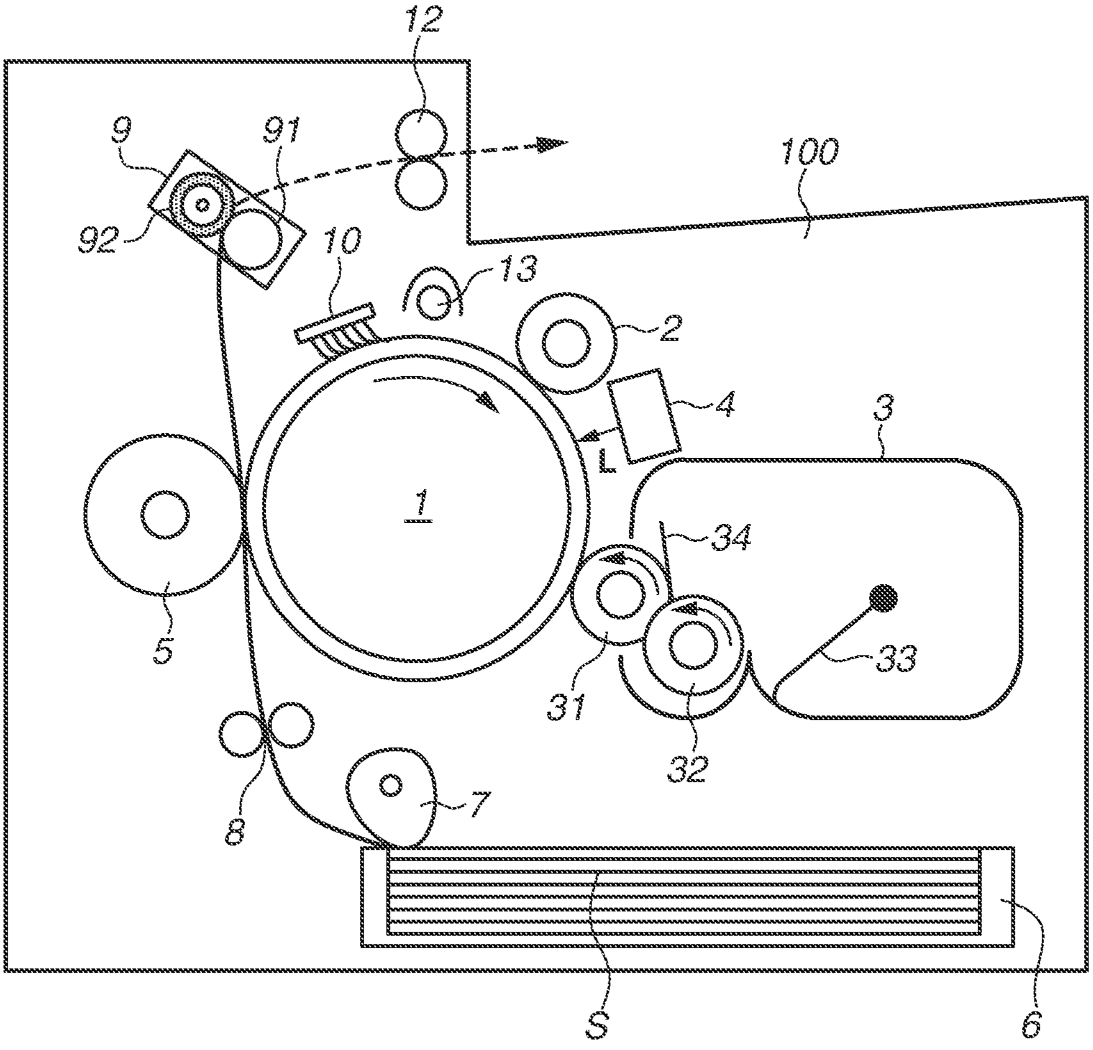
FIG. 1 illustrates an image-forming apparatus according to a first exemplary embodiment.

FIG. 1 illustrates a schematic configuration of an image-forming apparatus 100 according to a first exemplary embodiment of the present disclosure.

The image-forming apparatus 100 according to the present exemplary embodiment is a monochrome laser beam printer that adopts a cleanerless method and a contact charging method.

The image-forming apparatus 100 according to the present exemplary embodiment is provided with a photosensitive drum 1 which is a cylindrical photosensitive member serving as an image bearing member. A charging roller 2 as a charging unit and a developing device 3 as a developing unit are provided in the vicinity of the photosensitive drum 1. In FIG. 1, an exposure device 4 as an exposure unit is provided between the charging roller 2 and the developing device 3 in the rotation direction of the photosensitive drum 1. A transfer roller 5 as a transfer unit is in pressure contact with the photosensitive drum 1.

The photosensitive drum 1 according to the present exemplary embodiment is a negatively charged organic photosensitive member. The photosensitive drum 1 has a photosensitive layer on an aluminum drum-shaped base member and is rotationally driven in the direction of an arrow in FIG. 1 (clockwise direction) at a predetermined process speed by a drive unit 110 (FIG. 2) serving as drive means. In the present exemplary embodiment, the process speed is 140 millimeters per second (mm/s), which is equivalent to a peripheral speed (surface moving speed) of the photosensitive drum 1, and an outer diameter of the photosensitive drum 1 is 24 millimeters (mm).

The charging roller 2 as a charging member is in contact with the photosensitive drum 1 with a predetermined pressure contact force to form a charging portion. The charging roller 2 is applied with a desired charging voltage by a charging voltage power supply 120 (FIG. 2) serving as charging voltage applying means and uniformly charges a surface of the photosensitive drum 1 to a predetermined potential. In the present exemplary embodiment, the surface of the photosensitive drum 1 is negatively charged by the charging roller 2. During charging processing, a predetermined charging voltage is applied to the charging roller 2 by the charging voltage power supply 120. In the present exemplary embodiment, a negative direct current (DC) voltage as a charging voltage is applied to the charging roller 2 during the charging processing. Accordingly, the surface of the photosensitive drum 1 is uniformly charged to a dark area potential Vd. The charging voltage during an image-forming operation is −1400 V, and the dark area potential Vd is −800 V. In more detail, the charging roller 2 charges the surface of the photosensitive drum 1 by electric discharge generated in at least one of minute gaps between the charging roller 2 and the photosensitive drum 1 formed upstream and downstream from the contact portion with the photosensitive drum 1 in the rotation direction of the photosensitive drum 1. However, for the ease of description, the contact portion between the charging roller 2 and the photosensitive drum 1 in the rotation direction of the photosensitive drum 1 is described as the charging portion.

In the present exemplary embodiment, the exposure device 4 as the exposure unit is a laser scanner device that outputs a laser beam L corresponding to image information input from an external device, such as a host computer, to scan and expose the surface of the photosensitive drum 1 to the laser beam L. An electrostatic latent image (an electrostatic image) based on the image information is formed on the surface of the photosensitive drum 1 through the exposure. According to the present exemplary embodiment, the dark area potential Vd of the surface of the photosensitive drum 1, which is uniformly formed by charging processing, is reduced in the absolute value by the exposure performed by the exposure device 4 and becomes a light area potential V1. Exposure intensity of the exposure device 4 is set such that the light area potential V1 is −150 V. In the present exemplary embodiment, a position on the photosensitive drum 1 exposed by the exposure device 4 in the rotation direction of the photosensitive drum 1 is referred to as an exposure portion (an exposure position). The exposure device 4 is not limited to a laser scanner device. Alternatively, a light-emitting diode (LED) array in which a plurality of LEDs is arranged along a longitudinal direction of the photosensitive drum 1 can be adopted.

According to the present exemplary embodiment, a contact developing method is used as a developing method. The developing device 3 includes a developing member, a developing roller 31 as developer carrying means, a toner supply roller 32 as developer supply means, a developer chamber (a developer container) 33 for storing toner, and a developing blade 34. The toner supplied from the developer chamber 33 to the developing roller 31 by the toner supply roller 32 passes through a blade nip, which is a contact portion between the developing roller 31 and the developing blade 34, and thus is charged to a predetermined polarity. The toner carried on the developing roller 31 transfers from the developing roller 31 to the photosensitive drum 1 at a developing portion in accordance with an electrostatic image. In the present exemplary embodiment, a contact portion between the developing roller 31 and the photosensitive drum 1 in the rotation direction of the photosensitive drum 1 is referred to as the developing portion. In the present exemplary embodiment, the developing roller 31 and the photosensitive drum 1 are kept in contact with each other and have no separation mechanism. In the present exemplary embodiment, the developing roller 31 is driven and rotated in a counterclockwise direction with the photosensitive drum 1 and the developing roller 31 rotating in a forward direction at the developing portion. While, in the present exemplary embodiment, the drive unit 110 as the drive means for driving the developing roller 31 also serves as a main motor 110 common to the drive unit for the photosensitive drum 1, the photosensitive drum 1 and the developing roller 31 may be rotated by the respective drive motors as members of a photosensitive drum drive unit and a developing roller drive unit, respectively. During development, a predetermined developing voltage is applied to the developing roller 31 by a developing voltage power supply 140 in FIG. 2 serving as developing voltage applying means. A control unit 200 controls the developing voltage power supply 140 to apply a DC voltage of −400 V to a core metal of the developing roller 31 as a developing voltage Vdc during rotation of the developing roller 31 and the photosensitive drum 1 in contact with each other in the image-forming operation. In the image-forming operation, the toner carried on the developing roller 31 is developed at an image forming potential V1 portion of the photosensitive drum 1 by an electrostatic force generated by a potential difference between the developing voltage Vdc=−400 V and an image forming potential V1=−150 V of the photosensitive drum 1.

In the following description, regarding a potential and an applied voltage, a voltage with a larger absolute value on a negative polarity side (for example, −1400 V to −800 V) is referred to as a high potential, and a voltage with a smaller absolute value on the negative polarity side (for example, −400 V to −800 V) is referred to as a low potential. This is because negatively charged toner is a reference in the present exemplary embodiment.

In the present exemplary embodiment, a voltage is expressed as a potential difference from a ground potential (0 V). Thus, the developing voltage Vdc=−400 V is interpreted as having a potential difference of −400 V with respect to the ground potential by the developing voltage applied to the core metal of the developing roller 31. The same is true for a charging voltage, a transfer voltage, and others.

In the present exemplary embodiment, the photosensitive drum 1 is applied with a negative DC voltage as the developing voltage, uniformly charged, and then exposed. The toner charged to the same polarity as the charging polarity of the photosensitive drum 1 (the negative polarity in the present exemplary embodiment) adheres to an exposure surface (an image area) that is an image-forming portion on the photosensitive drum 1 where the absolute value of a surface potential of the photosensitive drum 1 is lowered. This developing method is referred to as a reversal developing method. In the present exemplary embodiment, a normal polarity, which is the charging polarity of the toner during development, is the negative polarity. The developing voltage of −400 V is applied during the image-forming operation, whereby a toner image is developed on the photosensitive drum 1 with toner from the developing roller 31 by the electrostatic force due to the potential difference between the developing voltage of −400 V and the light area potential V1=−150 V of the photosensitive drum 1. In the present exemplary embodiment, a non-magnetic one-component contact developing method is adopted, but the present disclosure is not limited to the method and may adopt a non-magnetic two-component contact developing method, a non-contact developing method, a magnetic developing method, and the like. In the non-magnetic two-component contact developing method, two-component developer including non-magnetic toner and a magnetic carrier is used as developer, and a toner image is developed by bringing the developer in a form of a magnetic brush carried on a developer carrying member into contact with the photosensitive drum 1. In the non-contact developing method, toner image development is performed by causing the toner to fly to the photosensitive member from the developer carrying member facing the photosensitive member in a non-contact manner. In the magnetic developing method, a toner image is developed with magnetic toner carried by a magnetic force on the developer carrying member which faces the photosensitive member in a contact or a non-contact manner and includes a magnet serving as a magnetic field generating unit. In the present exemplary embodiment, toner having a center average particle diameter of 6 micrometers (μm) and a normal charging polarity of negative polarity is used.

The transfer roller 5, which is a transfer member, is made of an elastic member, such as sponge rubber made of polyurethane rubber, ethylene propylene diene rubber (EPDM), nitrile-butadiene rubber (NBR) or the like. The transfer roller 5 is pressed toward the photosensitive drum 1 and forms a transfer portion where the photosensitive drum 1 and the transfer roller 5 are in pressure contact with each other. During transfer of the toner image, a predetermined transfer voltage is applied to the transfer roller 5 by a transfer voltage power supply 160 (FIG. 2) serving as transfer voltage applying means. In the present exemplary embodiment, during the transfer, a DC voltage with a polarity opposite to the normal polarity of the toner (positive polarity in the present exemplary embodiment) is applied to the transfer roller 5 as a transfer voltage, whereby an electric field is formed between the transfer roller 5 and the photosensitive drum 1. By an action of the electric field, the toner image on the photosensitive drum 1 is electrostatically transferred to a recording material S.

The recording material S stored in a cassette 6 is fed by a sheet feeding unit 7, passes through a registration roller pair 8, and is conveyed to the transfer portion in synchronization with arrival of the toner image formed on the photosensitive drum 1 in the transfer portion. The toner image formed on the photosensitive drum 1 is transferred to the recording material S by the transfer roller 5 receiving a predetermined transfer voltage applied from the transfer voltage power supply 160.

The recording material S on which the toner image has been transferred is conveyed to a fixing device 9. The fixing device 9 is a film heating type fixing device equipped with a fixing heater (not illustrated), a fixing film 91 with a built-in thermistor (not illustrated) for measuring a temperature of the fixing heater, and a pressure roller 92 in pressing contact with the fixing film 91. The recording material S is heated and pressed at the fixing device 9, and the toner image is fixed on the recording material S. The recording material S is discharged out of the image-forming apparatus 100 through a discharge roller pair 12.

According to the present exemplary embodiment, a brush 10 as a paper dust removal member is disposed downstream from the transfer portion and is in contact with the photosensitive drum 1. The brush 10 removes paper dust that has been transferred to the photosensitive drum 1 from the recording material S when the recording material S has passed through the transfer portion.

According to the present exemplary embodiment, a pre-exposure device 13 as pre-charging exposure means is disposed downstream from the brush 10 and upstream from the charging roller 2 in the rotation direction of the photosensitive drum 1 to ensure uniformity of the potential on the photosensitive drum 1 after transfer. According to the present exemplary embodiment, an LED attached to a side surface of a main body (not illustrated) is operated as the pre-exposure device 13 to irradiate the photosensitive drum 1 with light in parallel to a main scanning direction of the photosensitive drum 1. A light guide as a light guide member can be used to suppress irradiation unevenness in the main scanning direction.

Transfer residual toner remaining on the photosensitive drum 1 without being transferred to the recording material S passes through an abutment portion of the brush 10 and is negatively charged again by electric discharge by the charging roller 2 at the charging portion after the potential on the photosensitive drum 1 is uniformed by the pre-exposure device 13. The transfer residual toner negatively charged again by the charging roller 2 arrives the developing portion by the rotation of the photosensitive drum 1. The transfer residual toner at the developing portion moves to a surface of the developing roller 31 and is collected inside the developer container 33.

Control Unit

Figure 2:
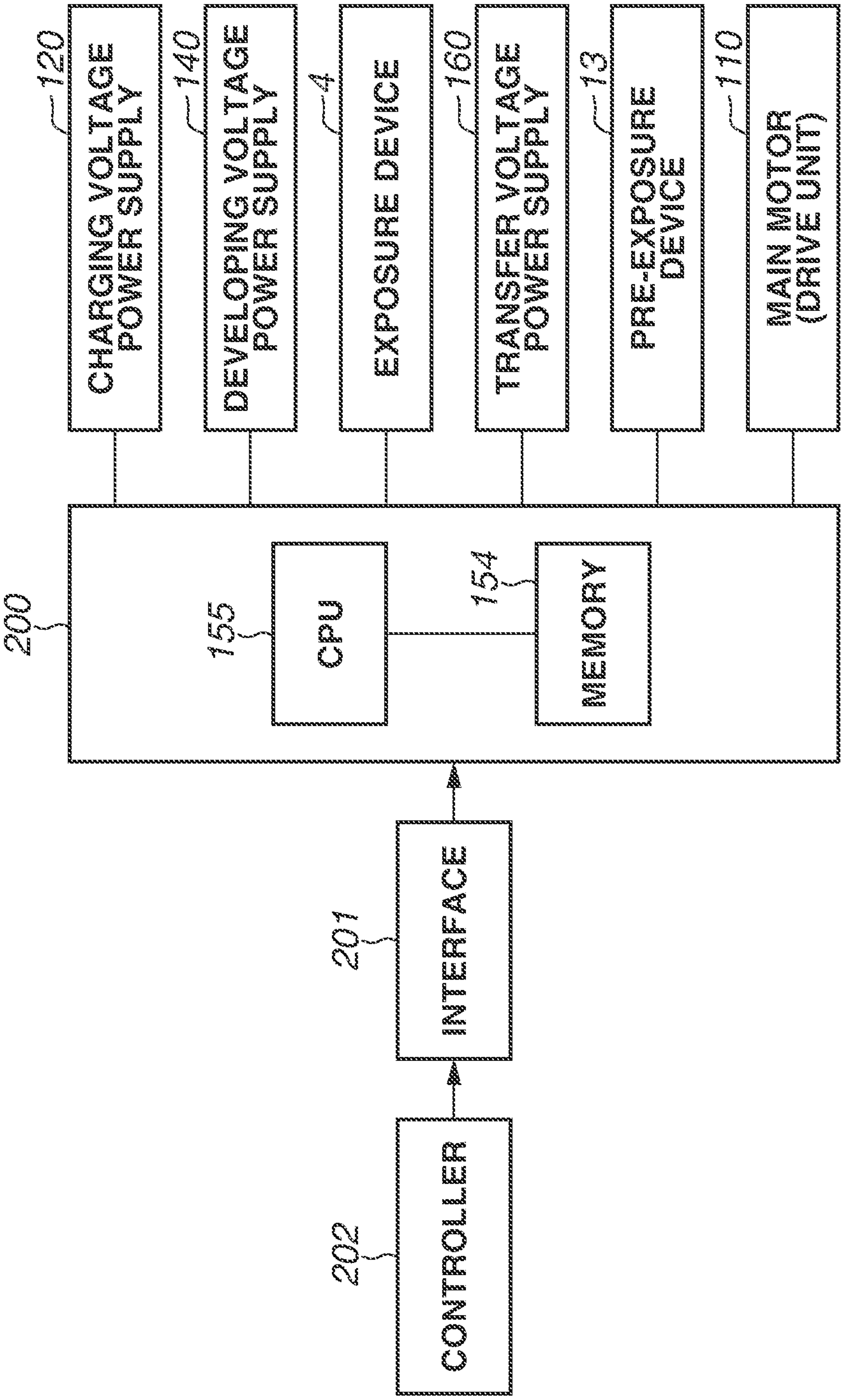
FIG. 2 is a schematic block diagram illustrating a main part relating to control of the image-forming apparatus according to the first exemplary embodiment.

Next, the control unit 200 is described. FIG. 2 is a control block diagram illustrating a main general part relating to control of the image-forming apparatus 100 according to the present exemplary embodiment. A controller 202 exchanges various types of electrical information with a host apparatus and comprehensively controls the image-forming operation of the image-forming apparatus 100 by using the control unit 200 via an interface 201 according to a predetermined control program and a reference table. The control unit 200 includes a central processing unit (CPU) 155, which is a central element that performs various arithmetic operations and a memory 154 serving as a storing unit, such as a read-only memory (ROM) and a random access memory (RAM), which are storage elements. The memory 154 stores information about the number of executions of the image-forming operation, which is a feature of the present exemplary embodiment. Specifically, the memory 154 stores information about the number of printed sheets, the number of rotations of the photosensitive drum 1, the number of rotations of the developing roller 31, and the like. The number of printed sheets are counted since the initial state of the image-forming apparatus 100. The RAM stores a detection result of a sensor, a count result of a counter, a calculation result, and the like, and the ROM stores a control program, a data table obtained in advance from an experiment, and the like. The control unit 200 is connected to each control target, sensor, counter, and the like in the image-forming apparatus 100. The control unit 200 controls transmission and reception of various electrical information signals and timing of driving each unit to control a predetermined image-forming sequence. For example, the control unit 200 controls voltages to be applied by the charging voltage power supply 120, the developing voltage power supply 140, and the transfer voltage power supply 160, and exposure amounts of the exposure device 4 and the pre-exposure device 13. The control unit 200 also controls the main motor (drive unit) 110. The image-forming apparatus 100 forms an image on the recording material S based on an electrical image signal input from the host apparatus to the controller 202. Examples of the host apparatus include an image reader, a personal computer, a facsimile, and a smartphone.

Image Output Operation

The image-forming apparatus 100 performs a series of operations to form an image on one or a plurality of recording materials S in response to an instruction to start one image output operation (job) from an external device (not illustrated), such as a personal computer. The job generally includes a pre-rotation process, an image-forming process (printing process), a sheet interval process in a case where the image is formed on a plurality of recording materials S, and a post-rotation process. The image-forming process is a process for forming an electrostatic image on the photosensitive drum 1, developing an electrostatic image (forming a toner image), transferring the toner image, and fixing the toner image, and an image-forming time is a period during which the image-forming process is executed. In the image-forming time, that is, in the period during which the image-forming process is executed, timings of executing respective operations, such as forming the electrostatic image, forming the toner image, transferring the toner image, and fixing the toner image are different from each other. The pre-rotation process is a process for performing a preparation operation before the image-forming process. The sheet interval process is a process that is executed between the image-forming process for a first recording material S and the image-forming process for a second recording material S subsequent to the first recording material S in a case where the image-forming process is continuously performed on the plurality of recording materials S (continuous image-forming time). The post-rotation process is a process for an arrangement operation (preparation operation) after the image-forming process. A non-image-forming time is a period other than the image-forming time and includes the pre-rotation process, the sheet interval process, and the post-rotation process. The pre-rotation process, which is the preparation operation at the time of when the image-forming apparatus 100 is turned on or is returned from a sleep state, is also included in the non-image-forming time.

Toner Dirt on Charging Roller

The surface of the photosensitive drum 1 includes an area of the image-forming portion where an electrostatic latent image is formed and an area of a non-image-forming portion where the electrostatic latent image is not formed. A behavior of the transfer residual toner in the image-forming operation is described separately for the image-forming portion and the non-image-forming portion of the photosensitive drum 1.

The transfer residual toner adhering to the image-forming portion of the photosensitive drum 1 is not transferred from the photosensitive drum 1 to the developing roller 31 at the developing portion, moves to the transfer portion together with the toner developed by the developing roller 31, and is transferred to the recording material S in the image formation.

On the other hand, the transfer residual toner adhering to the non-image-forming portion of the photosensitive drum 1 is charged again to the negative polarity, which is the normal polarity, in the charging portion, and is transferred to the developing roller 31 due to a potential difference between a potential of the non-image-forming portion of the photosensitive drum 1 and the developing voltage at the developing portion. The toner transferred to the developing roller 31 is collected into the developer chamber 33 and is used again in image formation.

In the present exemplary embodiment, in order to sufficiently transfer the negatively charged toner on the photosensitive drum 1 to the developing roller 31, a difference Vback, which is a potential difference (back contrast) in the developing portion calculated by subtracting the dark area potential Vd from the developing voltage (the developing voltage—the dark area potential Vd of the photosensitive drum 1), is set to 400 V. As the difference Vback is larger, the negatively charged toner is more easily moved from the photosensitive drum 1 to the developing roller 31, and developer recovery performance is improved.

Since the image-forming apparatus 100 according to the present exemplary embodiment does not have a toner cleaning unit on the photosensitive drum 1, the image-forming apparatus 100 is more likely to cause an image defect due to the transfer residual toner not transferred from the photosensitive drum 1 to the recording material S in the transfer portion and fogging toner transferred from the developing portion to the photosensitive drum 1 than the configuration in which the photosensitive drum 1 is provided with the toner cleaning unit.

Figure 3:
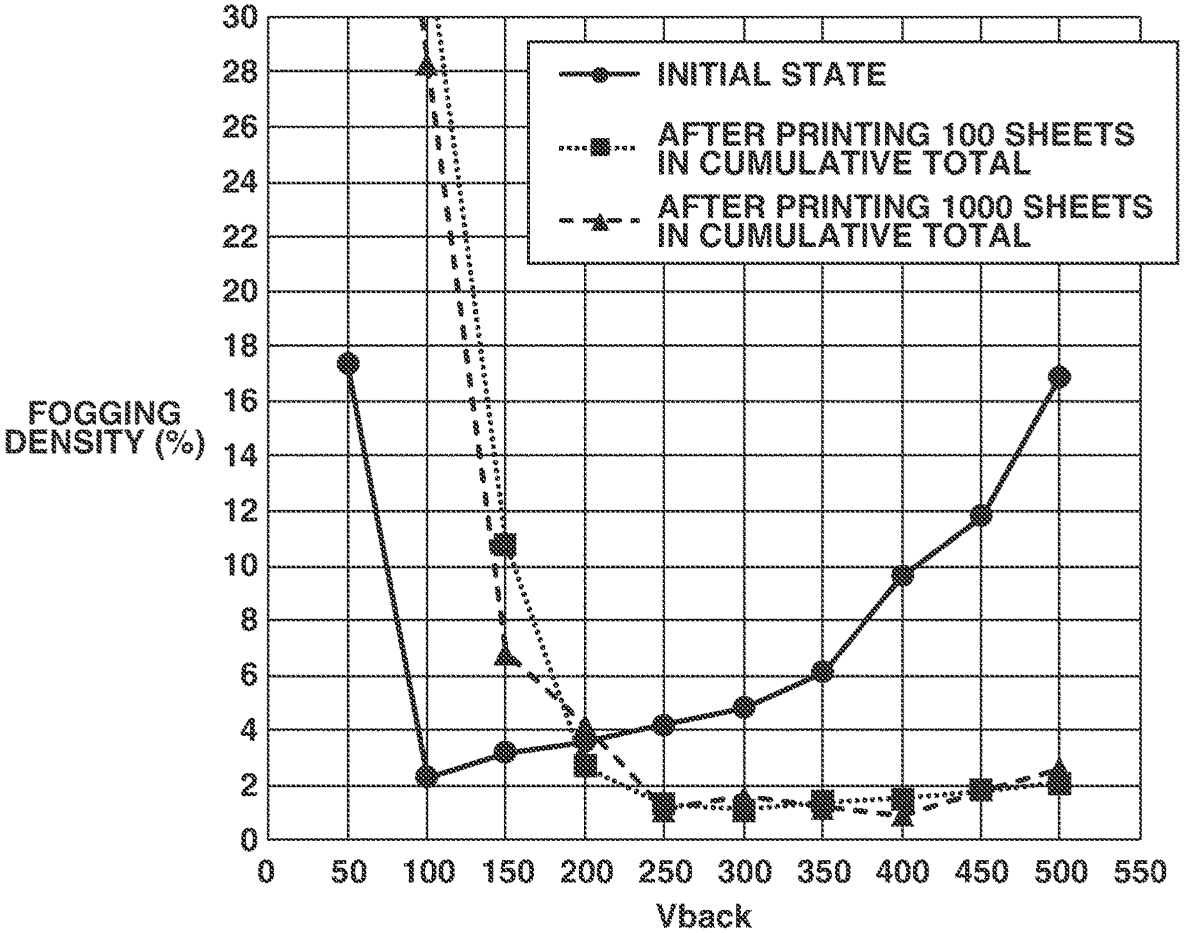
FIG. 3 is a diagram illustrating measurement results of fogging toner density of the image-forming apparatus according to the first exemplary embodiment.

FIG. 3 illustrates results of measuring toner density (%) on the photosensitive drum 1 of fogging occurred at the developing portion of the image-forming apparatus 100 according to the present exemplary embodiment. The measurement was carried out by the following method.

First, the image-forming apparatus 100 according to the present exemplary embodiment was started in the same manner as in a printing operation, and the charging voltage, the developing voltage, and the like were set under the above-described conditions to obtain a desired latent image setting. Then, rotational driving of the photosensitive drum 1 was stopped, and after stopping the rotational driving of the photosensitive drum 1, a polyester tape (manufactured by Nichiban, No. 5511) was attached on the surface of the photosensitive drum 1 between the developing portion and the transfer portion in the rotation direction of the photosensitive drum 1. The fogging toner on the surface of the photosensitive drum 1 was collected by peeling off the attached tape.

The fogging toner on the surface of the photosensitive drum 1 was collected a plurality of times by changing the latent image setting, and the difference Vback (back contrast), which is the difference between the surface potential of the photosensitive drum 1 and the developing voltage in the developing portion, was appropriately set from 50 V to 500 V in increments of 50 V at each time.

The tape that collected the fogging toner on the surface of the photosensitive drum 1 was attached to Xerox Vitality Multipurpose Paper (Letter size, 20 lb). Then, whiteness D1 (%) of a portion where the tape was attached and whiteness D2 (%) of a portion where the tape was not attached were each measured using a fogging measuring instrument (trade name: REFLECTMETER MODEL TC-6DS, manufactured by Tokyo Denshoku Co., Ltd.). From the measurement results, D2 (%)−D1 (%) was calculated as the fogging toner density (%).

The fogging toner density (%) on the photosensitive drum 1 was measured when the image-forming apparatus 100 according to the present exemplary embodiment was in the initial state, that is, when the toner was brand-new, after printing 100 sheets in cumulative total, and after printing 1000 sheets in cumulative total.

As illustrated in FIG. 3, in the initial state of the image-forming apparatus 100 according to the present exemplary embodiment, the fogging toner on the photosensitive drum 1 tends to increase as the difference Vback increases, and fogging due to reversed toner (hereinbelow, referred to as reversal fogging) is likely to occur on the photosensitive drum 1. Since the difference Vback is 400 V during the image-forming operation of the image-forming apparatus 100 according to the present exemplary embodiment, it can be seen that a large amount of reversed toner tends to adhere to the charging roller 2 after the image-forming operation in the initial state of image-forming apparatus 100 according to the present exemplary embodiment. Further, as illustrated in FIG. 3, there is a tendency that fogging due to development of the toner charged to the normal polarity on the developing roller 31 to the photosensitive drum 1 (hereinbelow, referred to as normal fogging) is less likely to occur even if the difference Vback is small in the initial state of the image-forming apparatus 100. This is because, in the initial state of the image-forming apparatus 100, that is, the toner is closer to the initial state, a ratio of toner that is not sufficiently charged to the normal polarity is greater, and thus the toner tends to become reversed toner due to the potential difference in the developing portion.

As illustrated in FIG. 3, in a case of the image-forming apparatus 100 printed 100 sheets in cumulative total, it can be seen that the reversal fogging is less likely to occur, and the reversed toner is in a state of being less likely to adhere to the charging roller 2 even after the image-forming operation. Further, as illustrated in FIG. 3, in the case of the image-forming apparatus 100 printed 100 sheets in cumulative total, it can be seen that the fogging toner tends to occur on the photosensitive drum 1 as the difference Vback is smaller. This is because, in the image-forming apparatus 100 used for a certain extent, that is, the toner has been used to some extent, the toner is sufficiently charged to the normal polarity, and the reversed toner is less likely to occur due to the potential difference in the developing portion.

As illustrated in FIG. 3, in a case of the image-forming apparatus 100 printed 1000 sheets in cumulative total, the tendency of the fogging toner on the photosensitive drum 1 is almost the same as the case of the image-forming apparatus 100 printed 100 sheets in cumulative total. This is because, in the image-forming apparatus 100 used for a further extent, and the toner has been reached to a state easily charged to the normal polarity in the developing portion, the state is maintained for a long period of time.

Figure 4:
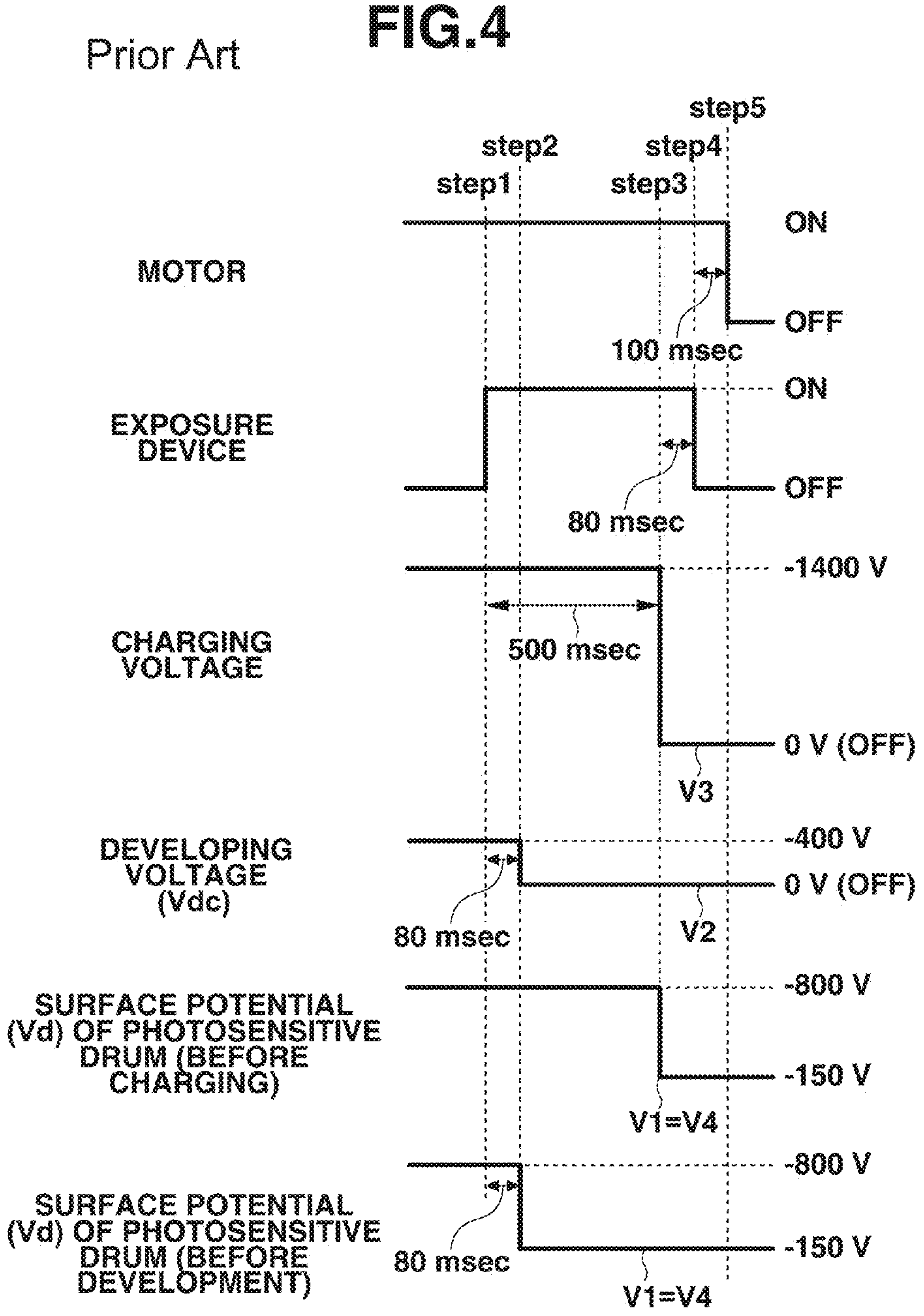
FIG. 4 is a diagram illustrating a stop operation of an image-forming apparatus having a conventional configuration.

FIG. 4 illustrates an example of a stop operation by a conventional image-forming apparatus 100. A timing (step 5) when the main motor 110 that drives the photosensitive drum 1 is turned off illustrated in FIG. 4 is defined as a time when the image-forming apparatus 100 is stopped. The surface potential of the photosensitive drum 1 (before charging) illustrated in FIG. 4 is the potential on the surface of the photosensitive drum 1 immediately before entering the charging portion, and the surface potential of the photosensitive drum 1 (before development) is the potential on the surface of the photosensitive drum 1 immediately before entering the developing portion.

As illustrated in FIG. 4, first, in step 1, the photosensitive drum 1 is exposed by the exposure device 4, and the surface potential of the photosensitive drum 1 is set to V1, which is a set potential at the time of stopping the image-forming apparatus 100. The exposure by the exposure device 4 is executed with the same exposure intensity as in the image-forming operation to set the potential V1 to −150 V, which is the same as the light area potential V1.

Next, in step 2, the developing voltage is changed to V2, which is the set voltage at the time of stopping the image-forming apparatus 100. The developing voltage is changed to V2 after 80 milliseconds (msec) from starting of the exposure from the exposure device 4 in step 1. Accordingly, the development voltage is changed to V2 in synchronization with arrival of the surface of the photosensitive drum 1 changed to the potential V1 in step 1 at the developing portion. In the present exemplary embodiment, the developing voltage is turned off in step 2, and thus the developing voltage V2 is 0 V. While, in the present exemplary embodiment, the developing voltage is turned off, it does not have to be off as long as the difference Vback is properly formed. The developing voltage can be set at a voltage with which the toner has the same polarity as the normal polarity and a value of the absolute value is smaller than that in the image-forming operation. Then, in step 5, the developing voltage can be turned off.

Next, in step 3, the charging voltage is changed to V3, which is the set voltage at the time of stopping the image-forming apparatus 100, after 500 msec from starting the exposure from the exposure device 4 in step 1. The charging voltage is changed to V3 after 500 msec from starting the exposure from the exposure device 4 in step 1, to change the charging voltage at the timing of arrival of the surface of the photosensitive drum 1 having the surface potential changed to V1 in step 1 at the charging portion. In the present exemplary embodiment, since the charging voltage is turned off in step 3, the charging voltage V3 is 0 V. While, in the present exemplary embodiment, the charging voltage is turned off, it does not have to be off as long as the difference Vback is properly formed. The charging voltage can be set at a voltage with which the toner has the same polarity as the normal polarity and the absolute value is smaller than that in the image-forming operation. Further, it is desirable that the charging voltage is lower than an electric discharge start voltage. Then, in step 5, the charging voltage can be turned off.

Next, in step 4, the exposure from the exposure device 4 is turned off after 600 msec from starting of the exposure from the exposure device 4 in step 1. While, in the present exemplary embodiment, the exposure from the exposure device 4 is turned off, it does not have to be turned off as long as the potential V1 is properly formed. An exposure amount can be set at any amount smaller than that in the image-forming operation. Then, in step 5, the exposure can be turned off. The exposure from the exposure device 4 is turned off after 600 msec from starting of the exposure from the exposure device 4 in step 1, whereby the surface potential formed around the entire circumference of the photosensitive drum 1 is set to V1, which is the set potential at the time of the stop operation of the image-forming apparatus 100. Because the image-forming apparatus 100 is stopped with the photosensitive drum 1 having the uniform surface potential on the entire circumference, it is possible to suppress occurrence of an image defect due to uneven surface potential of the photosensitive drum 1 in the next image-forming operation. Thus, it is desirable that the image-forming apparatus 100 is stopped after the entire circumference of the photosensitive drum 1 is set to the uniform surface potential.

Finally, in step 5, the main motor 110 that drives the photosensitive drum 1 is turned off after 100 msec from the turning off of the exposure from the exposure device 4, and the stop operation of the image-forming apparatus 100 is terminated. In order to suppress occurrence of a potential memory or a leakage on the surface of the photosensitive drum 1, it is common to turn off the voltage applied to each member being in contact with the photosensitive drum 1 and then stop the main motor 110 of the photosensitive drum 1 at the time of stopping the image-forming apparatus 100.

Figure 5:
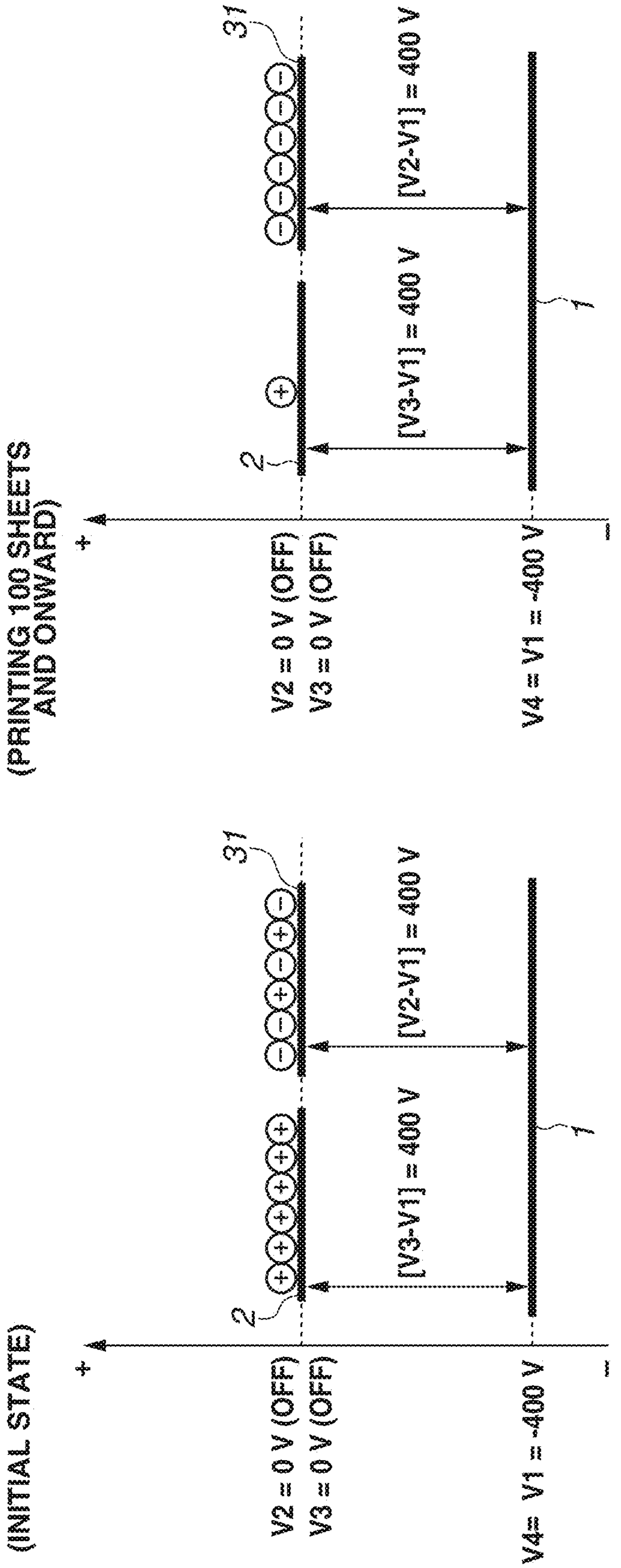
FIG.5 Prior Art
FIG. 5 is a first diagram illustrating a potential relationship between a charging portion and a developing portion at a time of stopping the image-forming apparatus having the conventional configuration.
Figure 6:
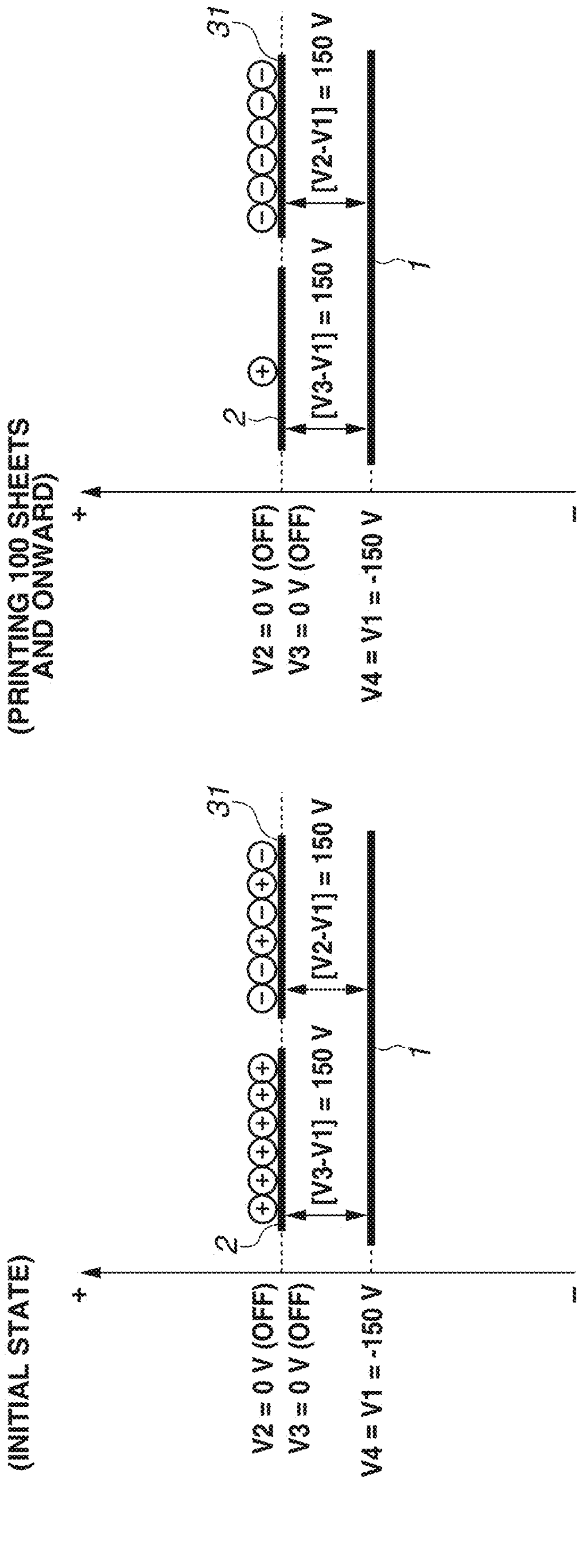
FIG.6 Prior Art
FIG. 6 is a second diagram illustrating the potential relationship between the charging portion and the developing portion at the time of stopping the image-forming apparatus having the conventional configuration.

FIGS. 5 and 6 are schematic diagrams illustrating a potential relationship between the charging portion and the developing portion in the stop operation of the conventional image-forming apparatus illustrated in FIG. 4, and amounts and polarities of toner adhering to each of the charging roller 2 and the developing roller 31 at the time of stopping the image-forming apparatus.

First, FIG. 5 illustrates a case where the stop operation is executed with the difference Vback fixed at 400 V. As illustrated in FIG. 5, because there is a lot of reversal fogging on the photosensitive drum 1 in the initial state of the image-forming apparatus 100, a large amount of positively charged reversed toner adheres to the charging roller 2.

Since the surface of the photosensitive drum 1 is negatively charged, the potential V1 is on the negative polarity side from the charging voltage V3, and in a case where a difference "V3−V1" is large, the reversed toner on the charging roller 2 receives an electrostatic force and easily moves from the charging roller 2 to the photosensitive drum 1.

In the initial state of the image-forming apparatus 100, the toner is not sufficiently charged to the negative polarity, which is the normal polarity, at the developing portion. Thus, some of the reversed toner adheres to the developing roller 31. As described with reference to FIG. 3, in a case where a difference "V2−V1" as the difference Vback is large, the reversal fogging from the developing roller 31 to the photosensitive drum 1 is likely to occur, but in a case where the difference "V2−V1" is small, the normal fogging from the developing roller 31 to the photosensitive drum 1 is less likely to occur.

Conversely, as illustrated in FIG. 5, in a case where the image-forming apparatus 100 printed 100 sheets in cumulative total, the reversal fogging on the photosensitive drum 1 is small. Thus, the amount of the reversed toner adhering to the charging roller 2 is small, and the amount of the reversed toner on the charging roller 2 that is moved from the charging roller 2 to the photosensitive drum 1 due to the electrostatic force is small regardless of magnitude of the difference "V3−V1".

In the case where the image-forming apparatus 100 printed 100 sheets in cumulative total, the toner is sufficiently charged to the negative polarity, which is the normal polarity, at the developing portion. Thus, the toner charged on the developing roller 31 is almost entirely charged to normal polarity. Accordingly, as described with reference to FIG. 3, even in a case where the difference "V2−V1" as the difference Vback is large, the reversal fogging from the developing roller 31 to the photosensitive drum 1 is less likely to occur. Conversely, in a case where the difference "V2−V1" is small, the normal fogging from the developing roller 31 to the photosensitive drum 1 is likely to occur.

Next, FIG. 6 illustrates a case where the stop operation is executed with the difference Vback fixed at 150 V. As illustrated in FIG. 6, in the stop operation of the conventional image-forming apparatus, each of the difference "V3−V1" and the difference "V2−V1" is as small as 150 V. Thus, in the initial state of the image-forming apparatus 100 at the time of stopping, transfer of the reversed toner from the charging roller 2 to the photosensitive drum 1, and the reversal fogging and the normal fogging from the developing roller 31 to the photosensitive drum 1 are both less likely to occur.

However, in the case where the image-forming apparatus 100 printed 100 sheets in cumulative total, the difference "V2−V1" is as small as 150 V, and thus a large amount of normal fogging occurs from the developing roller 31 to the photosensitive drum 1 at the time of stopping the image-forming apparatus 100 as illustrated in FIG. 3.

Feature of Present Exemplary Embodiment

Figure 7:
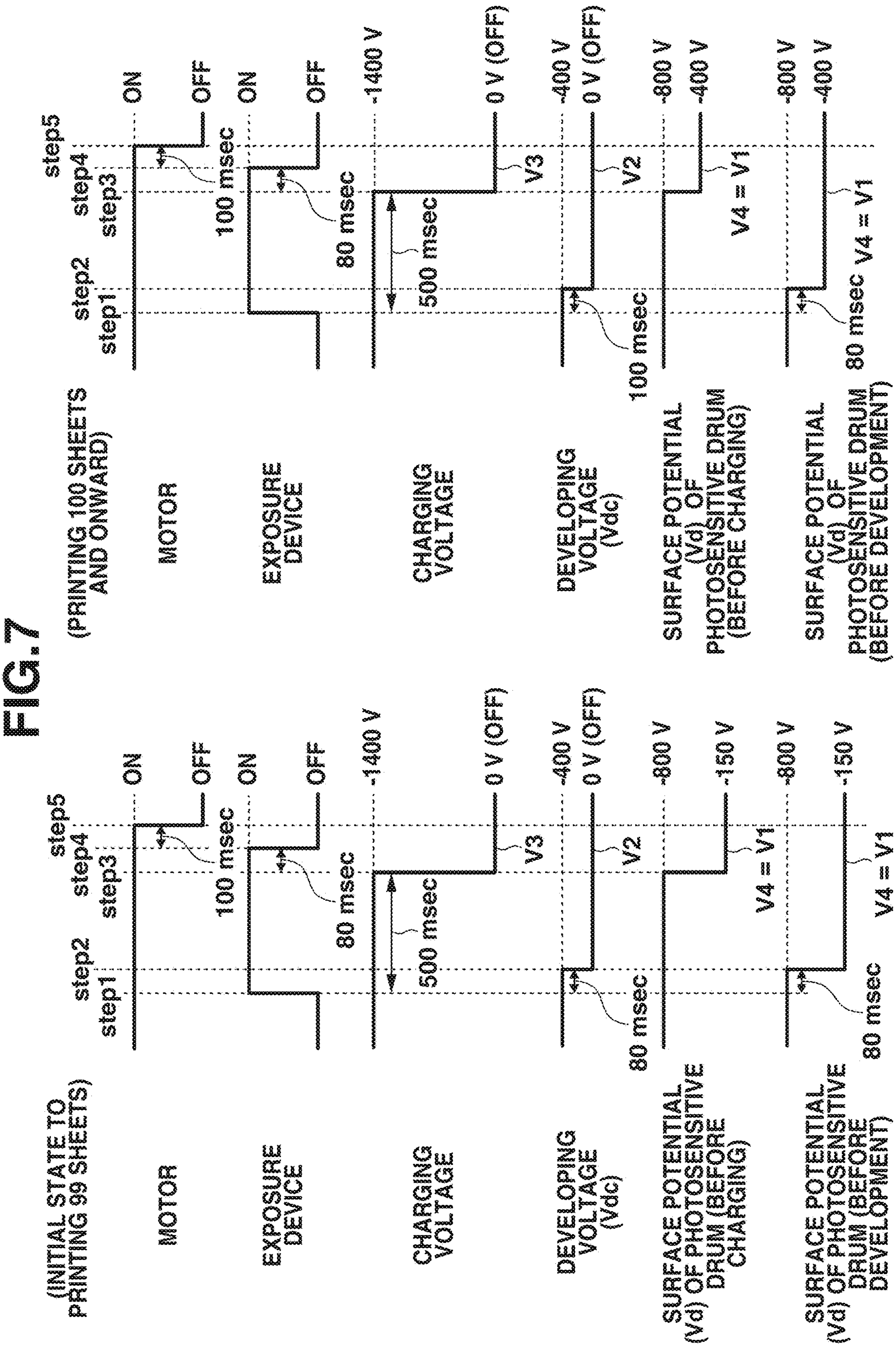
FIG. 7 is a diagram illustrating a stop operation of the image-forming apparatus according to the first exemplary embodiment.

In the present exemplary embodiment, the stop operation of the image-forming apparatus 100 illustrated in FIG. 7 is executed in view of a change in the tendency of the fogging toner on the photosensitive drum 1 due to a use state of the image-forming apparatus 100 described above and an accompanying issue that occurs at the time of stopping the image-forming apparatus 100.

In the stop operation of the image-forming apparatus 100 according to the present exemplary embodiment illustrated in FIG. 7, the difference "V2−V1" and the difference "V3−V1" are each changed to be different between a period from the initial state of the image-forming apparatus 100 to the 99th cumulative print and a period from the 100th cumulative print and onward. Accordingly, the present exemplary embodiment is characterized by simultaneously suppressing the moving of reversed toner from the charging roller 2 to the photosensitive drum 1 and the occurrence of fogging on the photosensitive drum 1 in the developing portion at the time of stopping the image-forming apparatus 100.

Specifically, the exposure intensity of the exposure device 4 in step 1 is changed from the 100th cumulative print and onward after the period from the initial state of the image-forming apparatus 100 to the 99th cumulative print. More specifically, the potential V1 is set to −150 V in the period from the initial state to the 99th cumulative print and is set to −400 V in the period from the 100th cumulative print and onward.

Other operations are the same as those in the stop operation of the image-forming apparatus 100 in FIG. 4, and the redundant descriptions are omitted.

Figure 8:
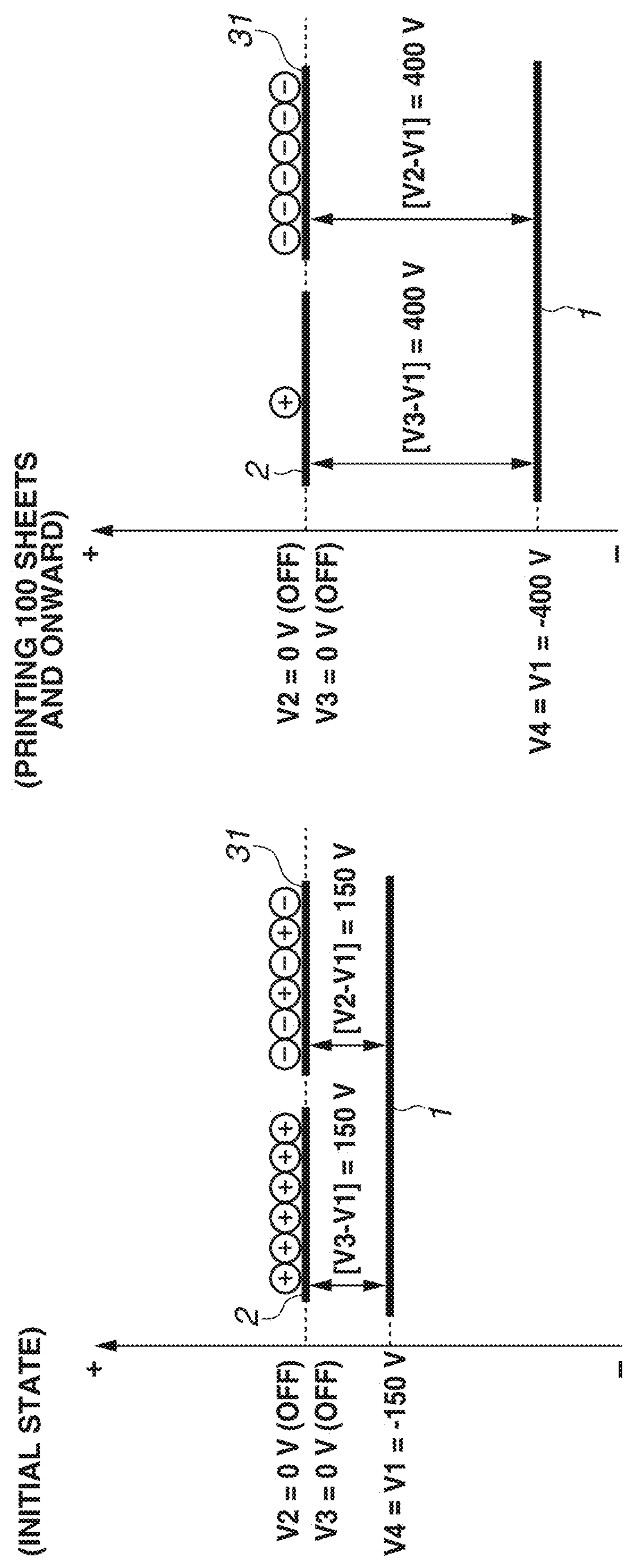
FIG. 8 is a diagram illustrating a potential relationship between a charging portion and a developing portion at the time of stopping the image-forming apparatus according to the first exemplary embodiment.

An effect of control in the stop operation of the image-forming apparatus 100 according to the present exemplary embodiment is described. FIG. 8 illustrates the potential relationship between the charging portion and the developing portion at the time of stopping the image-forming apparatus 100 based on the stop operation of the image-forming apparatus 100 in the present exemplary embodiment. As illustrated in FIG. 8, during the period from the initial state of the image-forming apparatus 100 to the 99th cumulative print, the potential V1 is set to −150 V, and the charging voltage V3 is set to 0 V. Thus, the difference "V3−V1"=150 V is established. From the 100th cumulative print and onward, the potential V1 is set to −400 V, and the charging voltage V3 is set to 0 V. Thus, the difference "V3−V1"=400 V is established.

As described with reference to FIG. 3, in the present exemplary embodiment, there is a lot of reversal fogging from the developing portion in the initial state of the image-forming apparatus 100. Consequently, the amount of the reversed toner adhering to the charging roller 2 is large. From the 100th cumulative print of the image-forming apparatus 100 and onward, there is little reversal fogging from the developing portion, and the amount of the reversed toner adhering to the charging roller 2 is small. Thus, in the initial state of the image-forming apparatus 100 in which the transfer of the reversed toner from the charging roller 2 to the photosensitive drum 1 is likely to occur, the control is performed such that the difference "V3−V1" is small. Performing the control in this way can suppress the moving of the reversed toner from the charging roller 2 to the photosensitive drum 1. In addition, in the period from the 100th cumulative print of the image-forming apparatus 100 and onward in which the difference "V3−V1" is controlled to be larger than that in the initial state, the amount of the reversed toner adhering to the charging roller 2 is small in the first place, and the transfer of the reversed toner from the charging roller 2 to the photosensitive drum 1 is less likely to occur.

In summary, in the present exemplary embodiment, the difference "V3−V1" is changed to be different between the period from the initial state of the image-forming apparatus 100 to the 99th cumulative print and in the period after 100th cumulative print and onward, in accordance with the reversal fogging from the developing portion and the amount of the reversed toner adhering to the charging roller 2 associated the reversed fogging. Thus, the moving of the reversed toner from the charging roller 2 to the photosensitive drum 1 can be suppressed regardless of the use state of the image-forming apparatus 100.

Further, as described with reference to FIG. 3, in the present exemplary embodiment, even in a case where the difference Vback is small, the normal fogging from the developing portion is less likely to occur in the initial state of the image-forming apparatus 100, and in a case where the difference Vback is small, the normal fogging from the developing portion is likely to occur from the 100th cumulative print and onward. The difference Vback at the time of the stop operation of the image-forming apparatus 100 can be obtained by calculating the difference "V2−V1", and in the present exemplary embodiment, the potential V1 is set to −150 V, the developing voltage V2 is set to 0 V, and thus the difference Vback is 150 V in the period from the initial state of the image-forming apparatus 100 to the 99th cumulative print. Then, the potential V1 is set to −400 V, the charging voltage V3 is set to 0 V, and thus the difference Vback is 400 V in the period from the 100th cumulative print and onward. Consequently, in the initial state of the image-forming apparatus 100, the difference Vback is small at the time of stopping the image-forming apparatus 100. However, in the initial state of the image-forming apparatus 100, even in a case where the difference Vback is small, the normal fogging is less likely to occur in the developing portion. Thus, the normal fogging does not occur in the developing portion even at the time of stopping the image-forming apparatus 100. In the period from the 100th cumulative print and onward, the difference Vback at the time of stopping the image-forming apparatus 100 is set larger, and thus it is also possible to suppress the occurrence of the normal fogging in the developing portion.

From the above description, the difference "V3−V1" is changed different between the period in the initial state and the period from the 100th cumulative print and onward in accordance with the tendency of occurrence of the normal fogging from the developing portion, whereby the occurrence of the normal fogging from the developing portion at the time of stopping the image-forming apparatus 100 can be suppressed regardless of the use state of the image-forming apparatus 100.

The configuration according to the first exemplary embodiment has the following features.

The image-forming apparatus 100 that can execute an image-forming operation for forming an image on a recording material S includes the photosensitive drum 1 configured to be rotatable and the charging roller 2 that forms the charging portion by being in contact with the photosensitive drum 1 and charges the surface of the photosensitive drum 1 at the charging portion. In addition, the image-forming apparatus 100 includes the developing roller 31 that supplies toner to the photosensitive drum 1 at the developing portion facing the photosensitive drum 1, the drive unit 110 that rotationally drives the photosensitive drum 1, and the memory 154 that stores information about the number of execution times of the image-forming operation.

The image-forming apparatus 100 further includes the charging voltage power supply 120 that applies the charging voltage to the charging roller 2, the developing voltage power supply 140 that applies the developing voltage to the developing roller 31, and the control unit 200 that controls the drive unit 110, the charging voltage power supply 120, and the developing voltage power supply 140. In a case of shifting from a first state in which the photosensitive drum 1 rotates to a second state in which the photosensitive drum 1 stops, the surface potential formed on the surface of the photosensitive drum 1, the developing voltage, and the charging voltage are defined as follows. The surface potential of the photosensitive drum 1 formed in the developing portion is defined as V1, the developing voltage applied to the developing roller 31 is defined as V2, the charging voltage applied to the charging roller 2 is defined as V3, and the surface potential of the photosensitive drum 1 formed in the charging portion is defined as V4. The control unit 200 controls a first potential difference, which is a potential difference between the developing voltage V2 and the surface potential V1, and a second potential difference, which is a potential difference between the charging voltage V3 and the surface potential V4, based on information about the number of execution times of the image-forming operation.

In the present exemplary embodiment, the same surface potential is formed as the surface potential V1 of the photosensitive drum 1 formed in the developing portion and as the surface potential V4 of the photosensitive drum 1 formed in the charging portion. The surface potential formed on the surface of the entire circumference of the photosensitive drum 1 can be considered to be substantially uniform as long as there is no influence by the members. Thus, the surface potential V4=V1 is established, and control targets are the difference "V2−V1" and the difference "V3−V1". Accordingly, a second difference value is "V3−V4" but may be regarded as "V3−V1".

Further, the control unit 200 performs control such that the first potential difference of a case where the number of printed sheets is a second number of sheets that is less than a first number of sheets is smaller than the first potential difference of a case where the number of printed sheets is the first number of sheets. Then, the control unit 200 performs control such that the second potential difference of a case where the number of printed sheets is a fourth number of sheets that is less than a third number of sheets is smaller than the second potential difference of a case where the number of printed sheets is the third number of sheets. In other words, the control unit 200 performs control such that magnitude of the electrostatic force for moving the toner charged to the normal polarity from the developing roller 31 to the photosensitive drum 1 is smaller in the first potential difference formed in the case of the second number of sheets than in the first potential difference formed in the case of the first number of sheets. The control unit 200 also performs control such that the magnitude of the electrostatic force for moving the toner charged to the polarity opposite to the normal polarity from the charging member to the image bearing member is smaller in the second potential difference formed in the case of the fourth number of sheets than in the second potential difference formed in the case of the third number of sheets. Further, the control unit 200 performs control such that the first potential difference is less than or equal to an electric discharge threshold value in a case where the first potential difference is formed and the second potential difference is less than or equal to the electric discharge threshold value in a case where the second potential difference is formed. The control unit 200 performs control such that the developing voltage V2 has the polarity opposite to the normal polarity, which is the charging polarity of the toner, and the charging voltage V3 has the normal polarity, which is the charging polarity of the toner. The charging roller 2 and the developing roller 31 are each in contact with the photosensitive drum 1 in a state where rotational driving of the photosensitive drum 1 is stopped. With this configuration, in a case where the photosensitive drum 1 stops, an effect of suppressing the adverse effect that occurs at the charging portion and the developing portion is remarkable.

As described above, the difference "V2−V1" and the difference "V3−V1" are each changed to be different between the period from the initial state of the image-forming apparatus 100 to the 99th cumulative print and in the period from the 100th cumulative print and onward in accordance with the tendency of occurrence of the reversal fogging and the normal fogging in the developing portion. Thus, it is possible to simultaneously suppress the moving of the reversed toner adhering to the charging roller 2 to the photosensitive drum 1 and the occurrence of the normal fogging in the developing portion, both of which occur at the time of the stop operation of the image-forming apparatus 100.

In the present exemplary embodiment, values of the difference "V2−V1" and the difference "V3−V1" are changed in accordance with the cumulative number of printed sheets of the image-forming apparatus 100. However, it is also possible to determine a charged state of the toner in the developing portion and the tendency of the fogging toner on the photosensitive drum 1 associated with the charged sate of toner based on the cumulative number of rotations of the developing roller 31. Thus, the values of the difference "V2−V1" and the difference "V3−V1" can be changed in accordance with the cumulative number of rotations of the developing roller 31 or the like, for example, the number of rotations of the photosensitive drum 1, the remaining amount of toner in the developer container 33, and a toner consumption amount calculated from a printing rate.

In the present exemplary embodiment, the values of the difference "V2−V1" and the difference "V3−V1" are changed when the cumulative number of printed sheets of the image-forming apparatus 100 reaches 100 sheets. However, how many sheets are printed from the initial state before the toner at the developing portion is sufficiently charged and the tendency of the fogging toner on the photosensitive drum 1 changes is different depending on the toner, the developing roller 31, and the like used in the image-forming apparatus 100. Thus, a threshold value of the cumulative number of printed sheets for changing the values of the difference "V2−V1" and the difference "V3−V1" can be set in accordance with the configuration of the image-forming apparatus 100. For example, the threshold value can be changed in accordance with the difference in the printing rate as described above, or an environment, such as temperature and humidity. In the present exemplary embodiment, the amount of toner filled in a new developer container is 120 grams (g). In this case, it is known that, in a case where printing is performed at, for example, a printing rate of 5% (printing area ratio of a case where an entirely black image is 100% and an entirely white image is 0%), a ratio of toner having small particle diameters is suppressed after approximately 100 sheets are printed. Thus, the control is switched after printing of 100 sheets. The control can be switched in this way, based on a toner replenishment amount, the printing rate, the toner consumption amount, and the like.

According to the present exemplary embodiment, the values of the difference "V2−V1" and the difference "V3−V1" are changed when the cumulative number of printed sheets of the image-forming apparatus 100 reaches 100 sheets. However, the threshold value of the cumulative number of printed sheets for changing the values of the difference "V2−V1" and the difference "V3−V1" can be increased. With this control, it is possible to more accurately suppress the moving of the reversed toner adhering to the charging roller 2 to the photosensitive drum 1 and the occurrence of the normal fogging in the developing portion, both of which occur at the time of the stop operation of the image-forming apparatus 100.

In the present exemplary embodiment, the difference "V3−V1" and the difference "V2−V1" are changed to increase at a timing of when the toner is sufficiently charged to the normal polarity at the developing portion as the cumulative number of printed sheets of the image-forming apparatus 100 increases. However, when the cumulative number of printed sheets of the image-forming apparatus 100 is further increased, deterioration of the toner at the developing portion may be noticeable. In a case where a charging characteristic of the toner at the developing portion is lowered, and if the difference Vback is large, the image-forming apparatus 100 may be in a state similar to the initial state in which a large amount of reversal fogging occurs. In such a case, the difference "V3−V1" and the difference "V2−V1" can be controlled to be reduced again. As described above, the difference "V3−V1" and the difference "V2−V1" can be changed in accordance with the tendency of occurrence of fogging on the photosensitive drum 1 at the developing portion with increase in the cumulative number of printed sheets of the image-forming apparatus 100.

Next, a second exemplary embodiment according to the present disclosure is described. A basic configuration and operations of an image-forming apparatus according to the second exemplary embodiment are the same as those of the image-forming apparatus 100 according to the first exemplary embodiment. Therefore, in the image-forming apparatus according to the second exemplary embodiment, elements having functions or configurations similar to or corresponding to those in the image-forming apparatus 100 according to the first exemplary embodiment are denoted by the same reference numerals in the image-forming apparatus 100 according to the first exemplary embodiment, and the detailed redundant descriptions are omitted.

Figure 9:
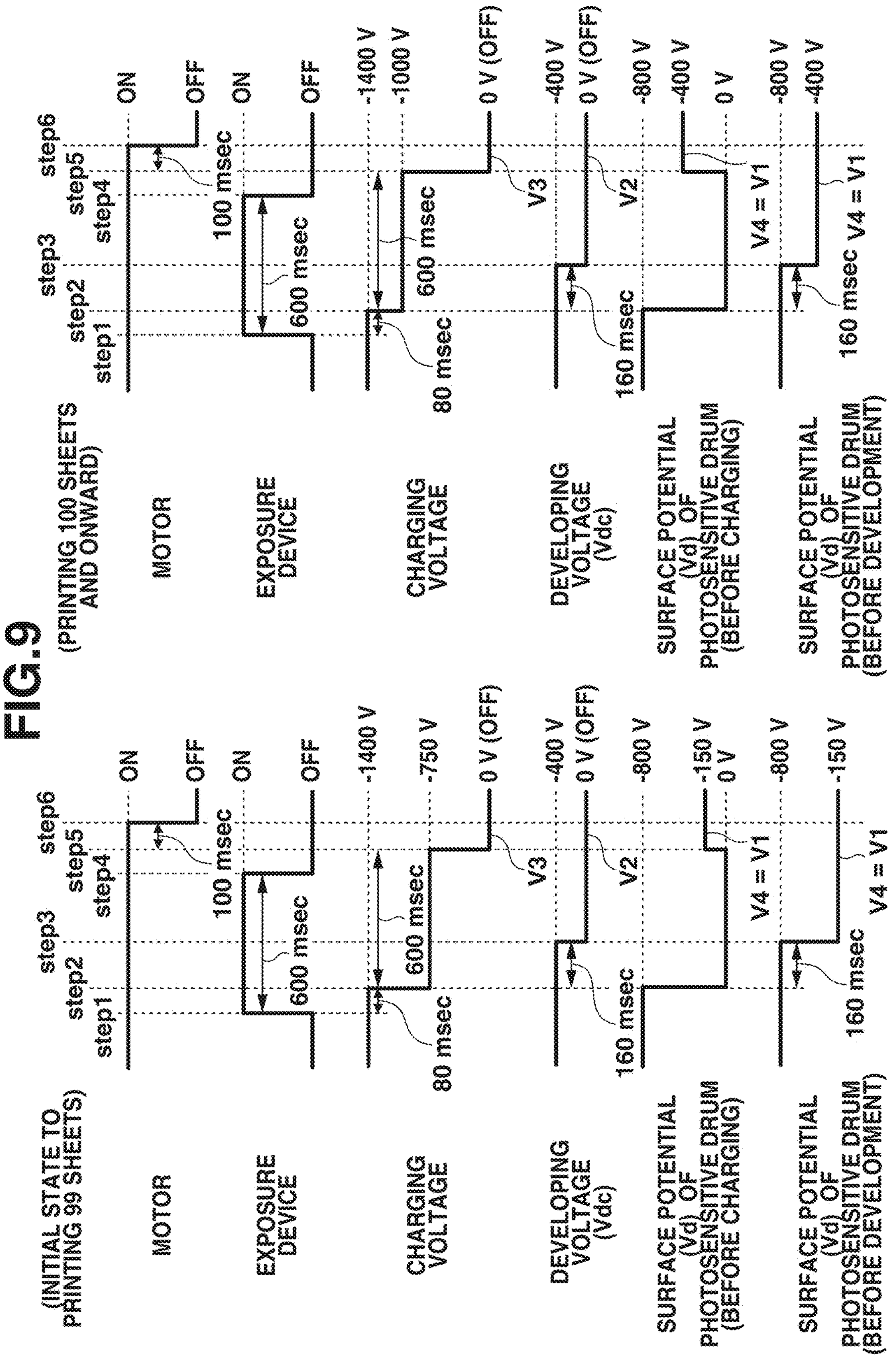
FIG. 9 is a diagram illustrating a stop operation of an image-forming apparatus according to a second exemplary embodiment.

In the present exemplary embodiment, the stop operation of the image-forming apparatus 100 illustrated in FIG. 9 is executed. Others are the same as those in the first exemplary embodiment, and the redundant descriptions are omitted.

First, as illustrated in FIG. 9, in step 1, the photosensitive drum 1 is neutralized by exposure using the pre-exposure device 13.

Next, in step 2, the surface of the photosensitive drum 1, which is neutralized by the pre-exposure device 13, is charged to V1, which is the set potential at the time of the stop operation of the image-forming apparatus 100, by changing the charging voltage.

The charging voltage is changed after 80 msec from when the pre-exposure device 13 starts the neutralization of the photosensitive drum 1, and thus the charging voltage is changed in synchronization with the timing of arrival of the surface of the photosensitive drum 1, which has been neutralized by the pre-exposure device 13, at the charging portion. In the initial state of the image-forming apparatus 100, the charging voltage is changed to −750 V in step 2. The surface potential V1 of the photosensitive drum 1 to which the charging voltage −750 V is applied is −150 V, and the charging voltage is changed to −1000 V in step 2 from the 100th cumulative print and onward, whereby the potential V1 becomes −400 V.

Next, in step 3, the developing voltage is changed to V2, which is the set voltage at the time of the stop operation of the image-forming apparatus 100 after 160 msec from the changing of the charging voltage in step 2. The developing voltage is changed to V2 after 160 msec from the changing of the charging voltage in step 2, and thus the developing voltage changes at the timing of arrival of the surface of the photosensitive drum 1 having the surface potential changed to V1 in step 2 at the developing portion. In the present exemplary embodiment, the developing voltage is turned off in step 2 to set V2 to 0 V. While, in the present exemplary embodiment, the developing voltage is turned off, it does not have to be off as long as the difference Vback is properly formed. The developing voltage can be set at a voltage with which the toner has the same polarity as the normal polarity and the absolute value is smaller than that in the image-forming operation. Then, in step 6, the developing voltage can be turned off. Alternatively, control similar to that according to a third exemplary embodiment, which is described below, can be adopted.

Next, in step 4, the exposure by the pre-exposure device 13 is turned off after 600 msec from the start of the exposure from the pre-exposure device 13 in step 1. While, in the present exemplary embodiment, the exposure from the pre-exposure device 13 is turned off, it does not have to be turned off as long as the potential V1 is properly formed. For example, in a case where the pre-exposure device 13 performs exposure in the image-forming operation, an exposure amount in step 1 can be any amount smaller than that in the image-forming operation. The exposure from the pre-exposure device 13 is turned off after 600 msec from the starting of the exposure in step 1, and thus the pre-exposure device 13 terminates the neutralization of the photosensitive drum 1 after neutralizing the entire circumference of the photosensitive drum 1.

Next, in step 5, the charging voltage is changed to V3, which is the charging voltage at the time of the stop operation of the image-forming apparatus 100, after 600 ms from the changing of the charging voltage in step 2. Thus, the surface potential of the entire circumference of the photosensitive drum 1 is set to the potential V1. In the present exemplary embodiment, the charging voltage is turned off in step 5, and thus the charging voltage V3 becomes 0 V. While, in the present exemplary embodiment, the charging voltage is turned off, it does not have to be off as long as the difference Vback is properly formed. The charging voltage can be set at a voltage with which the toner has the same polarity as the normal polarity and the absolute value is smaller than that in the image-forming operation. Further, it is desirable that the charging voltage is lower than the electric discharge start voltage. Then, in step 6, the charging voltage can be turned off. Alternatively, control similar to that according to a fourth exemplary embodiment, which will be described below, can be adopted.

Finally, in step 6, the main motor 110 that drives the photosensitive drum 1 is turned off after 100 msec from the changing of the charging voltage in step 5, and the stop operation of the image-forming apparatus 100 is terminated.

In the present exemplary embodiment, the difference "V2−V1" is −150 V in the period from the initial state of the image-forming apparatus 100 to the 99th cumulative print and is −400 V in the period from the 100th cumulative print and onward, similar to the first exemplary embodiment. Then, the difference "V3−V1" is 150 V in the period from the initial state of the image-forming apparatus 100 to the 99th cumulative print and is 400 V in the period from the 100th cumulative print and onward. Thus, the same effect as that of the first exemplary embodiment can be acquired.

In the third exemplary embodiment, a voltage power supply that can apply a positive DC voltage to a developing power supply is added to the image-forming apparatus 100 according to the second exemplary embodiment. In the present exemplary embodiment, the following changes are added to the stop operation of the image-forming apparatus 100 according to the second exemplary embodiment.

FIG. 10 illustrates the stop operation of the image-forming apparatus 100 in the present exemplary embodiment. As illustrated in FIG. 10, in the present exemplary embodiment, a setting value of the charging voltage after the changing of the charging voltage in step 2 is set to −500 V in the period from the initial state of the image-forming apparatus 100 to the 99th cumulative print and is set to −850 V in the period from the 100th cumulative print and onward. Thus, the potential V1 is set to 0 V in the initial state and is set to −250 V from the 100th cumulative print and onward.

A setting value of the developing voltage after the changing of the developing voltage in step 3 is 150 V.

Further, step 7 is newly added, and after the turning off of the main motor 110 that drives the photosensitive drum 1 in step 6, the developing voltage is turned off, and the stop operation of the image-forming apparatus 100 is terminated.

Between step 6 and step 7, the developing voltage is applied to the photosensitive drum 1 which has been stopped. Thus, it is desirable that the potential difference between the surface potential of the photosensitive drum 1 and the charging voltage in the charging portion is set to be less than or equal to the electric discharge threshold value in step 6 and step 7 to avoid causing a memory or a leakage on the photosensitive drum 1.

In the present exemplary embodiment, the difference "V3−V1" is set to 0 V in the period from the initial state of the image-forming apparatus 100 to the 99th cumulative print and is set to −250 V in the period from the 100th cumulative print and onward.

Further, the difference "V2−V1" is set to 150 V in the period from the initial state of the image-forming apparatus 100 to the 99th cumulative print and is set to 400 V in the period from the 100th cumulative print and onward. Thus, the moving of the reversed toner from the charging roller 2 to the photosensitive drum 1 can be further suppressed as compared with the second exemplary embodiment.

As described above, in the present exemplary embodiment, the voltage having the polarity opposite to the normal polarity of the toner is applied to the developing roller 31 to set the potential difference between the photosensitive drum 1 and the developing roller 31 at the developing portion to be less than or equal to the electric discharge threshold value at the time of the stop operation of the image-forming apparatus 100. With this configuration, it is possible to more effectively suppress the moving of the reversed toner from the charging roller 2 to the photosensitive drum 1 and also to suppress the normal fogging at the developing portion and the occurrence of the memory or the leakage on the photosensitive drum 1 at the developing portion.

In the fourth exemplary embodiment, the following changes are added to the stop operation of the image-forming apparatus 100 in the third exemplary embodiment.

Figure 11:
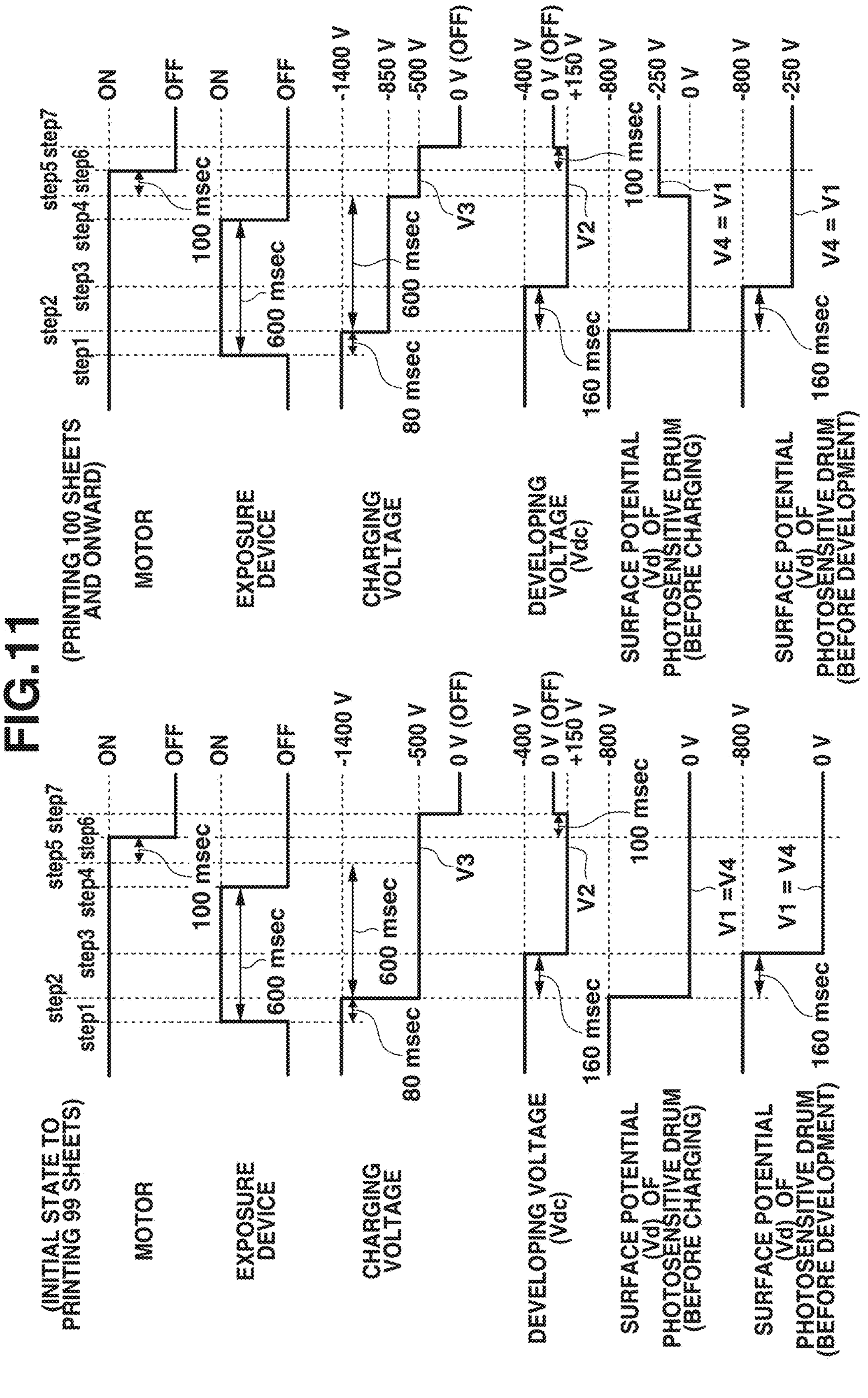
FIG. 11 is a diagram illustrating a stop operation of an image-forming apparatus according to a fourth exemplary embodiment.

FIG. 11 illustrates the stop operation of the image-forming apparatus 100 in the present exemplary embodiment.

In the present exemplary embodiment as illustrated in FIG. 11, although the charging voltage is turned off in step 5 in the third exemplary embodiment, the charging voltage is not turned off in step 5, and is turned off in step 7 after the main motor 110 that drives the photosensitive drum 1 is turned off in step 6. Consequently, the photosensitive drum 1 which has been stopped receives the charging voltage between step 6 and step 7. Thus, it is desirable that the potential difference between the surface potential of the photosensitive drum 1 and the charging voltage in the charging portion is set to be less than or equal to the electric discharge threshold value between step 6 and step 7 to avoid causing the memory or the leakage on the photosensitive drum 1 in the charging portion.

In the present exemplary embodiment, the difference "V3−V1" is set to 500 V in the period from the initial state of the image-forming apparatus 100 to the 99th cumulative print and is set to 250 V in the period from the 100th cumulative print and onward. The difference "V2−V1" is set to 150 V in the period from the initial state of the image-forming apparatus 100 to the 99th cumulative print and is set to 400 V in the period from the 100th cumulative print and onward. Thus, the transfer of the reversed toner from the charging roller 2 to the photosensitive drum 1 can be further suppressed as compared with the third exemplary embodiment.

In the present exemplary embodiment, as described above, the voltage is applied to the charging roller 2 to set the potential difference between the photosensitive drum 1 and the charging roller 2 in the charging portion to be less than or equal to the electric discharge threshold value at the time of the stop operation of the image-forming apparatus 100. Thus, it is possible to more effectively suppress the moving of the reversed toner from the charging roller 2 to the photosensitive drum 1 and also to suppress the normal fogging in the developing portion and the occurrence of the memory or the leakage of the photosensitive drum 1 in the charging portion.

In addition to the configurations in the first to the fourth exemplary embodiments, the developer container 33 for storing developer can be configured such that a developer replenishment container (toner bottle) 41 is detachably attached. In this configuration, a non-image-forming operation is controlled to be executed after attaching of the developer replenishment container 41 to the developer container 33 and replenishing of the developer in the developer container 33. The developer container 33 can also be detachably attached to the image-forming apparatus, and the control according to the present exemplary embodiment can be executed based on the counted number of printed sheets after replacement of the developer container 33.

Figure 12A:
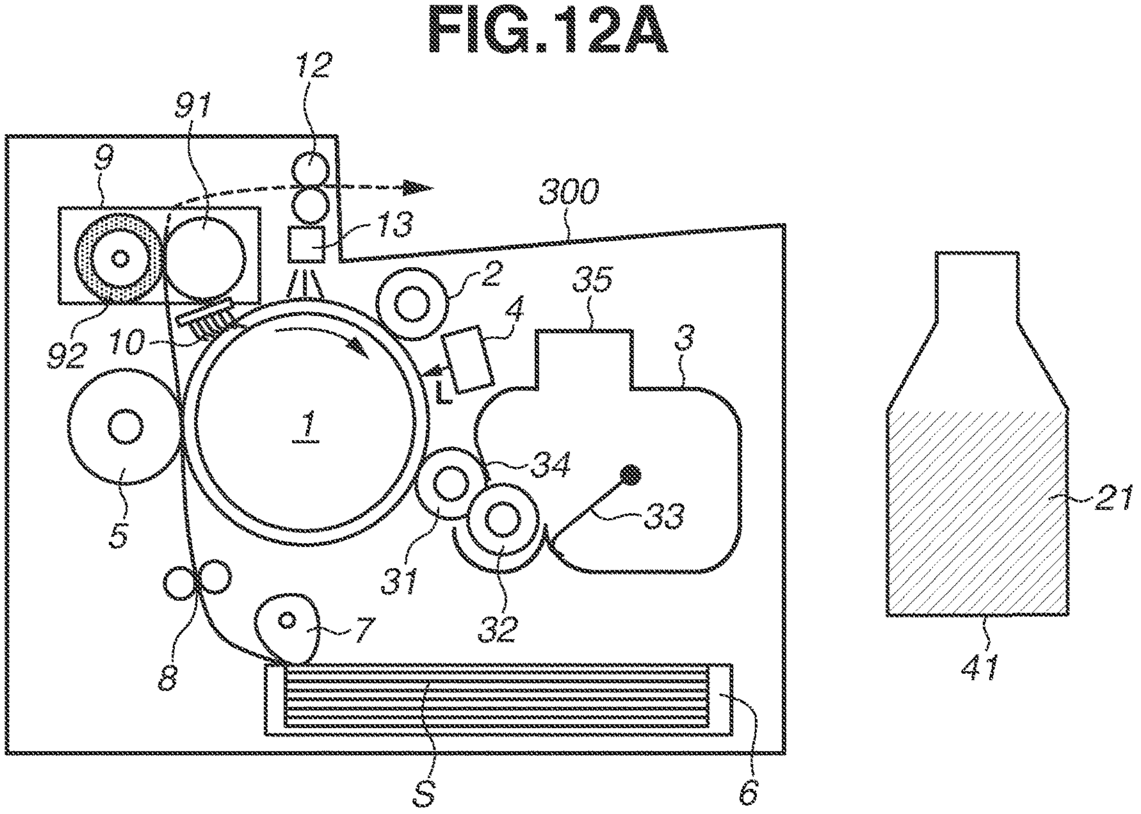
FIGS. 12A and 12B are diagrams each illustrating an image-forming apparatus according to another exemplary embodiment.
Figure 12B:
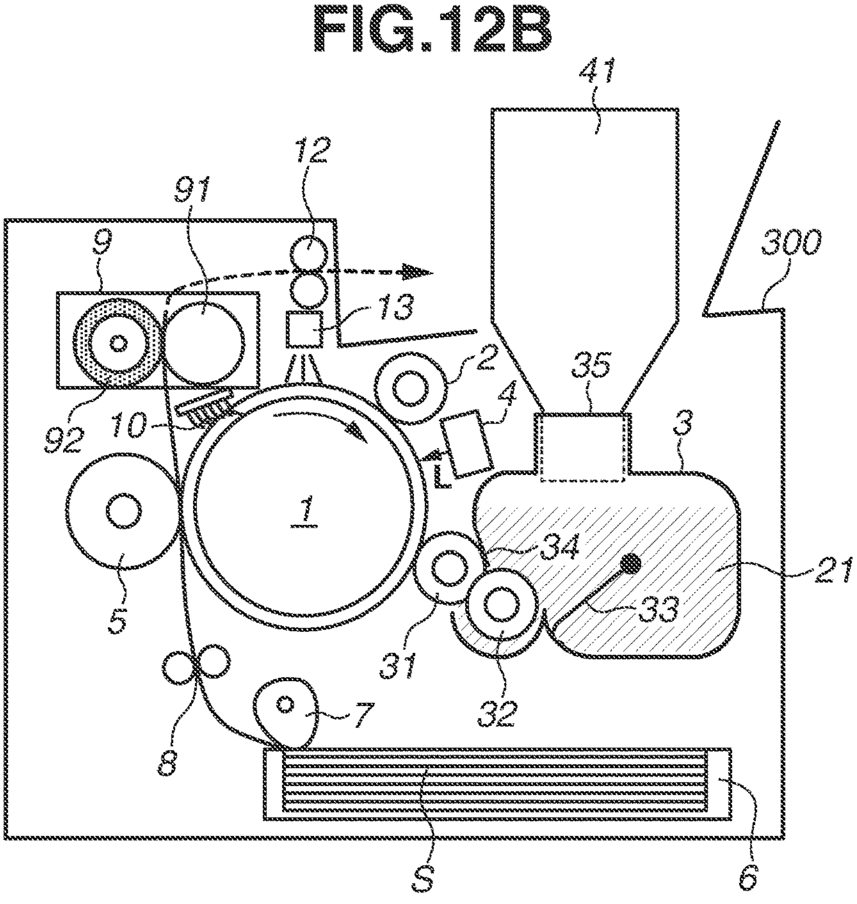

For example, as a modification of the present exemplary embodiment, a toner replenishment configuration of a direct replenishment method is described. As illustrated in FIG. 12A, an image-forming apparatus 300 according to the present exemplary embodiment is provided with an opening portion 35, which is a port for attaching the toner bottle 41, and toner 21 can be replenished through the opening portion 35. As illustrated in FIG. 12B, the toner bottle 41 is attached to the opening portion 35, the toner 21 moves from the toner bottle 41 to the developer container 33 by gravity, and thus the toner 21 can be replenished without the need for a special device, such as a toner replenishment path.

In a case where the toner 21 filled in the toner bottle 41 in FIG. 12A is supplied to the developer container 33 in FIG. 12A, almost all the toner 21 in the toner bottle 41 is stored in the developer container 33 as illustrated in FIG. 12B. The developer container 33 has a length in the longitudinal direction and has a volume sufficient to store all the toner 21 filled in the toner bottle 41.

Values of the charging voltage and the developing voltage, the number of switching times, an application time length, and the like can be adjusted in accordance with a change in capacitance due to wear of a surface layer of the photosensitive drum 1 in long-term use, a degree of deterioration of the toner, and the temperature and humidity of the environment.

As described above, according to the present disclosure, it is possible to suppress occurrence of an adverse effect on an image even in a state in which toner adheres to a charging member before a stop operation of an image-forming apparatus.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-045084, filed Mar. 22, 2022, which is hereby incorporated by reference herein in its entirety.

What is claimed is:

1. An image-forming apparatus to execute an image-forming operation to form an image on a recording material, the image-forming apparatus comprising:

an image bearing member configured to rotate;

a charging member configured to form a charging portion by being in contact with the image bearing member and to charge a surface of the image bearing member at the charging portion;

a developing member configured to supply toner to the image bearing member at a developing portion facing the image bearing member;

a drive unit configured to rotationally drive the image bearing member;

a storing unit configured to store information about a number of execution times of the image-forming operation;

a charging voltage applying unit configured to apply a charging voltage to the charging member;

a developing voltage applying unit configured to apply a developing voltage to the developing member; and a control unit configured to control the drive unit, the charging voltage applying unit, and the developing voltage applying unit, wherein, in a case where a first state in which the image bearing member rotates is shifted to a second state in which the image bearing member stops rotating, a surface potential of the image bearing member formed on the developing portion is defined as V1, the developing voltage applied to the developing member is defined as V2, the charging voltage applied to the charging member is defined as V3, and a surface potential of the image bearing member formed on the charging portion is defined as V4, and wherein the control unit controls a first potential difference, which is a potential difference between the V2 and the V1, and a second potential difference, which is a potential difference between the V3 and the V4, based on the information about the number of execution times of the image-forming operation.

2. The image-forming apparatus according to claim 1, wherein the V1 and the V4 are substantially the same as each other.

3. The image-forming apparatus according to claim 1, wherein the number of execution times information is a number of rotations of the image bearing member counted from when the image-forming apparatus is initially installed.

4. The image-forming apparatus according to claim 1, wherein the number of execution times information is a number of rotations of the developing member counted from when the image-forming apparatus is initially installed.

5. The image-forming apparatus according to claim 1, wherein the number of execution times information is a number of printed sheets counted from when the image-forming apparatus is initially installed.

6. The image-forming apparatus according to claim 5, wherein the control unit performs control such that magnitude of an electrostatic force acting between the image bearing member and the developing member and causing toner charged to a normal polarity to move from the developing member to the image bearing member is smaller in the first potential difference that is formed in a case where the number of printed sheets is a second number of sheets that is less than a first number of sheets than in the first potential difference that is formed in a case where the number of printed sheets is the first number of sheets.

7. The image-forming apparatus according to claim 6, wherein the control unit performs control such that magnitude of an electrostatic force acting between the image bearing member and the developing member and causing toner charged to a polarity opposite to the normal polarity to move from the charging member to the image bearing member is smaller in the second potential difference that is formed in a case where the number of printed sheets is a fourth number of sheets that is less than a third number of sheets than in the second potential difference that is formed in a case where the number of printed sheets is the third number of sheets.

8. The image-forming apparatus according to claim 1, wherein, in a case where the first potential difference is formed, the control unit performs control such that the first potential difference is less than or equal to an electric discharge threshold value.

9. The image-forming apparatus according to claim 1, wherein, in a case where the second potential difference is formed, the control unit performs control such that the second potential difference is less than or equal to an electric discharge threshold value.

10. The image-forming apparatus according to claim 1, wherein the control unit performs control such that the V2 has a polarity opposite to a normal polarity, which is a charging polarity of the toner.

11. The image-forming apparatus according to claim 1, wherein the control unit performs control such that the V3 has a normal polarity, which is a charging polarity of the toner.

12. The image-forming apparatus according to claim 1, wherein the charging member and the developing member are each in contact with the image bearing member in a state in which rotational driving of the image bearing member is stopped.

* * * * *